United States Patent
Miyamoto

(10) Patent No.: US 7,062,190 B2
(45) Date of Patent: Jun. 13, 2006

(54) IMAGE FORMING APPARATUS, INTERFACE APPARATUS, CONTROL APPARATUS, IMAGE FORMING APPARATUS SETTING OPERATION METHOD, AND CONTROL METHOD

(75) Inventor: Noriaki Miyamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 10/012,408

(22) Filed: Dec. 12, 2001

(65) Prior Publication Data

US 2002/0071689 A1    Jun. 13, 2002

(30) Foreign Application Priority Data

Dec. 13, 2000    (JP)    ............................ 2000-379121

(51) Int. Cl.
G03G 15/06    (2006.01)

(52) U.S. Cl. ........................................ 399/81; 358/1.13

(58) Field of Classification Search ............... 358/1.15, 358/1.13; 399/81, 53, 57, 58, 70, 43, 82, 399/85, 86, 204, 144, 145, 148, 158, 224, 399/231, 363, 364, 374, 383
See application file for complete search history.

(56) References Cited

U.S. PATENT DOCUMENTS

| | | | | |
|---|---|---|---|---|
| 4,682,158 | A | * | 7/1987 | Ito et al. ...................... 340/679 |
| 5,459,556 | A | * | 10/1995 | Acquaviva et al. ........... 399/58 |
| 5,528,732 | A | * | 6/1996 | Klotz, Jr. ..................... 358/1.6 |
| 5,793,935 | A | * | 8/1998 | Ko .............................. 358/1.2 |
| 5,802,420 | A | | 9/1998 | Garr et al. ..................... 399/27 |
| 5,930,006 | A | | 7/1999 | Yoshida et al. ............. 358/450 |
| 5,950,045 | A | * | 9/1999 | Nomura et al. ................ 399/81 |
| 6,266,153 | B1 | * | 7/2001 | Davidson et al. ............ 358/1.9 |
| 6,278,526 | B1 | * | 8/2001 | Kurozasa ................... 358/1.15 |
| 6,356,719 | B1 | | 3/2002 | Yoshiura ..................... 399/45 |
| 6,661,530 | B1 | * | 12/2003 | Munetomo et al. ........ 358/1.15 |

FOREIGN PATENT DOCUMENTS

| | | |
|---|---|---|
| EP | 0 864 933 A1 | 2/1998 |
| JP | 09206718 | 7/1997 |
| JP | 10073970 | 3/1998 |
| JP | 11-52630 | 2/1999 |

* cited by examiner

Primary Examiner—King Y. Poon
Assistant Examiner—Lucas Divine
(74) Attorney, Agent, or Firm—Fitzpatrick, Cella, Harper & Scinto

(57) ABSTRACT

An image forming apparatus includes resource amount designation keys for allowing a user to designate an amount of resource, display control keys for controlling to display a plurality of setting options which enable image formation with the designated amount of resource, selection keys for allowing the user to select a desired setting option from the plurality of setting options displayed, and setting keys for performing image formation setting with the setting option selected by the selection keys.

22 Claims, 25 Drawing Sheets

IMAGE FORMING APPARATUS, INTERFACE APPARATUS, CONTROL APPARATUS, IMAGE FORMING APPARATUS SETTING OPERATION METHOD, AND CONTROL METHOD

FIELD OF THE INVENTION

The present invention relates to an image forming apparatus, interface apparatus of an image forming apparatus, and image forming apparatus setting operation method, and more particularly, to an image forming apparatus, interface apparatus of the image forming apparatus, and image forming apparatus setting operation method adaptable to an ecology-conscious (energy saving/resource saving) trend.

BACKGROUND OF THE INVENTION

Conventionally, there are a number of ecology-conscious techniques for image forming apparatuses aimed at energy saving and resource saving.

Among these techniques, Japanese Patent Application Laid-Open No. 11-52630 discloses an energy-saving image forming apparatus as prior art related to energy saving and operability.

The conventional art has proposed a double-sided printing function and reduction layout function, in which plural pages of original documents are reduced and printed in one page, e.g., 2-in-1 (two pages of original documents are printed in one page), 4-in-1 (four pages of original documents are printed in one page) and so forth.

However, these conventional ecology-oriented functions are often introduced as one of the output functions of an image forming apparatus, and operation buttons for these functions are often scattered in a control panel. Moreover, since operation screens are deeply layered, users often do not know the availability of such functions, or cannot efficiently make use of the functions even if they know the availability of the functions, because of the complicated setting of the functions.

Furthermore, in addition to the double-sided printing function and reduction layout function, an image reduction function for outputting print paper having a size smaller than an original document's size (e.g., reducing A3-size paper to A4-size paper) may be regarded as an energy-saving/resource-saving technique. However, such function is often buried in layers of a single function such as a zoom function or reduction function, and is not efficiently utilized in many cases.

Moreover, conventional image forming apparatuses do not provide an operation interface that raises user's energy-saving/resource-saving awareness. For this reason, it has been difficult to induce users to perform operation that positively leads to energy saving/resources saving.

Furthermore, in the conventional image forming apparatuses, it is difficult for users to visually confirm how much energy-saving/resource-saving effects are achieved.

Still further, even in a case an image forming apparatus has the above-described double-sided printing function or reduction layout function, users often do not know how to set the energy-saving/resource-saving functions unless they thoroughly read a manual.

SUMMARY OF THE INVENTION

The present invention has been made in consideration of the above situation, and has as its object to display energy-saving/resource-saving functions in an easy-to-understand manner, and enable to perform the energy-saving/resource-saving setting with simple operation.

According to the present invention, the foregoing object is attained by providing an apparatus comprising a user interface including: resource amount designation means for allowing a user to designate an amount of resource; display control means for controlling to display a plurality of setting options which enable image formation with the designated amount of resource; selection means for allowing the user to select a desired setting option from the plurality of setting options displayed; and setting means for performing image formation setting with the setting option selected by the selection means.

According to the present invention, the foregoing object is attained by providing a setting operation method comprising: a resource amount designation step of allowing a user to designate an amount of resource; a display control step of controlling to display a plurality of setting options which enable image formation with the designated amount of resource; a selection step of allowing the user to select a desired setting option from the plurality of setting options displayed; and a setting step of performing image formation setting with the setting option selected at the selection step.

According to the foregoing configuration of the present invention, image formation settings are switched between the standard setting and energy-saving/resource-saving setting to meet user's needs.

Moreover, according to the foregoing configuration of the present invention, an output pattern of an original document can be selected from a plurality of output patterns based on a paper-saving rate. This helps to raise user's energy-saving/resource-saving awareness and facilitates setting operation.

Furthermore, according to the foregoing configuration of the present invention, a toner density is reduced in accordance with a desired output, thereby saving resources.

Moreover, according to the foregoing configuration of the present invention, an energy-saving/resource-saving level is displayed, enabling users to understand the energy-saving level intuitively and visually.

Furthermore, according to the foregoing configuration of the present invention, guidance helps users to understand in detail the energy-saving/resource-saving function of the image forming apparatus, and enables a first-time user to perform setting with ease.

Moreover, according to the foregoing configuration of the present invention, a setting condition or output can be previewed before copying operation, thereby enabling to reduce error copies.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<Overall System>

Figure 1:
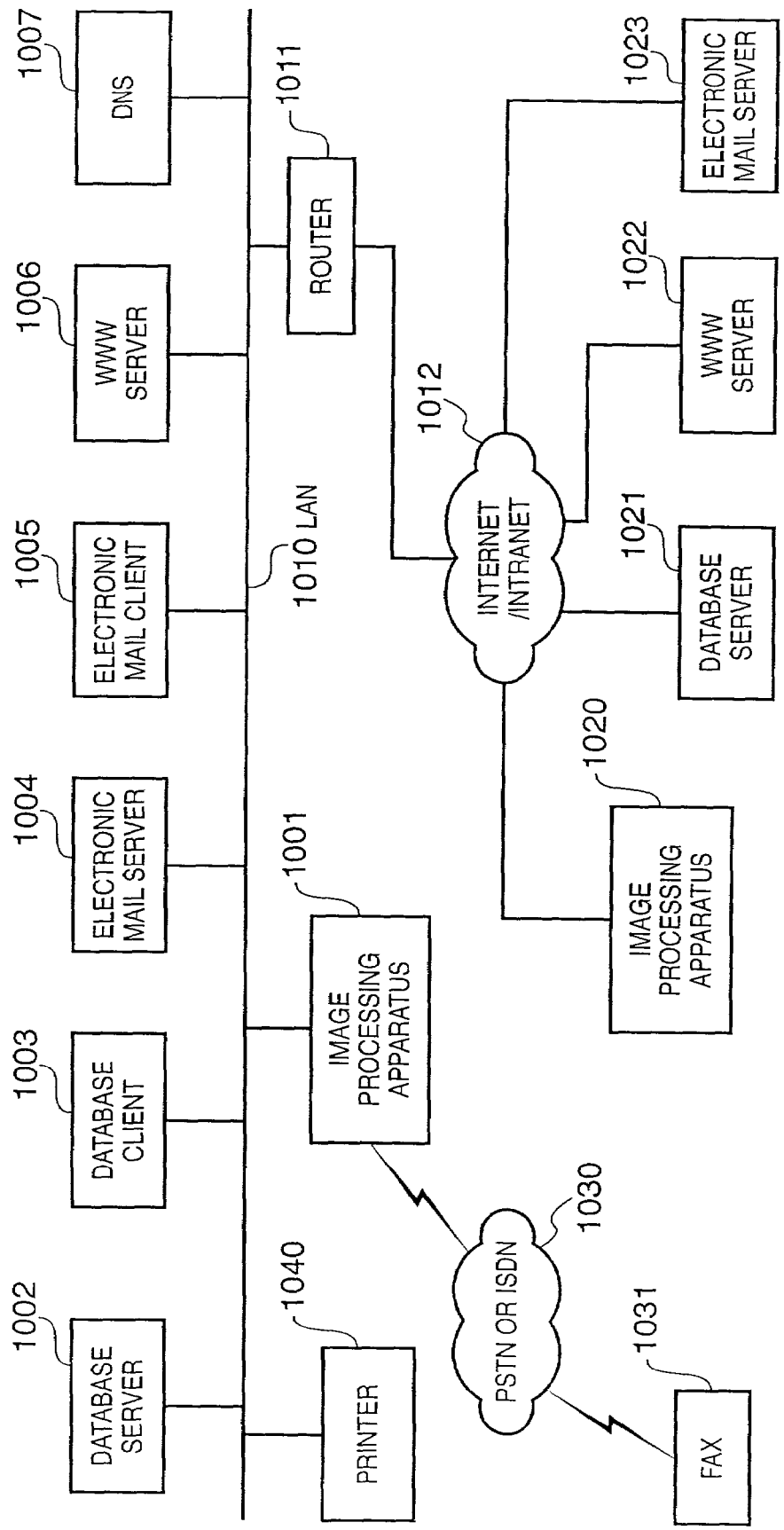
FIG. 1 is a block diagram showing an example of the configuration of a network system to which an image processing apparatus according to an embodiment of the present invention is connected.

FIG. 1 is a block diagram showing an example of the configuration of a network system to which an image input apparatus of this invention is connected. Reference numeral 1001 denotes an image processing apparatus comprising a scanner, serving as an image input apparatus of the present invention, and a printer. An image read in from the scanner can be sent to a local area network (LAN) 1010 or printed by a printer, or an image received from the LAN 1010 can be printed out by the printer. Further, an image read in from the scanner can be transmitted by facsimile transmission means (not shown) to a facsimile apparatus 1031 via a PSTN or ISDN 1030, or an image received via the PSTN or ISDN can be printed out by the printer.

A database server 1002 manages binary images and multilevel images, which have been read in by the image processing apparatus 1001, as a database. A database client 1003 of the database server 1002 is capable of browsing/retrieving image data that has been stored in the database 1002. An electronic mail server 1004 is capable of receiving an image, which has been read by the image processing apparatus 1001, as an attachment to e-mail. An electronic mail client 1005 is capable of receiving and browsing mail that has been accepted by the e-mail server 1004, and of transmitting e-mail. A WWW server 1006 supplies the LAN 1010 with HTML text. HTML text provided by the WWW server 1006 can be printed by the image processing apparatus 1001. Reference numeral 1007 denotes a DNS (Domain Name Server). A router 1011 connects the LAN 1010 to the Internet or to an intranet 1012. Devices similar to the image processing apparatus 1001, database server 1002, WWW server 1006 and electronic mail server 1004 are connected to the Internet/intranet as devices 1020, 1021, 1022, and 1023. Further, a printer 1040 is connected on the LAN 1010 and is capable of printing out images read by the image processing apparatus 1001.

<Configuration of the Image Processing Apparatus>

Next, a configuration of the image processing apparatus 1001 will be explained.

Figure 2:
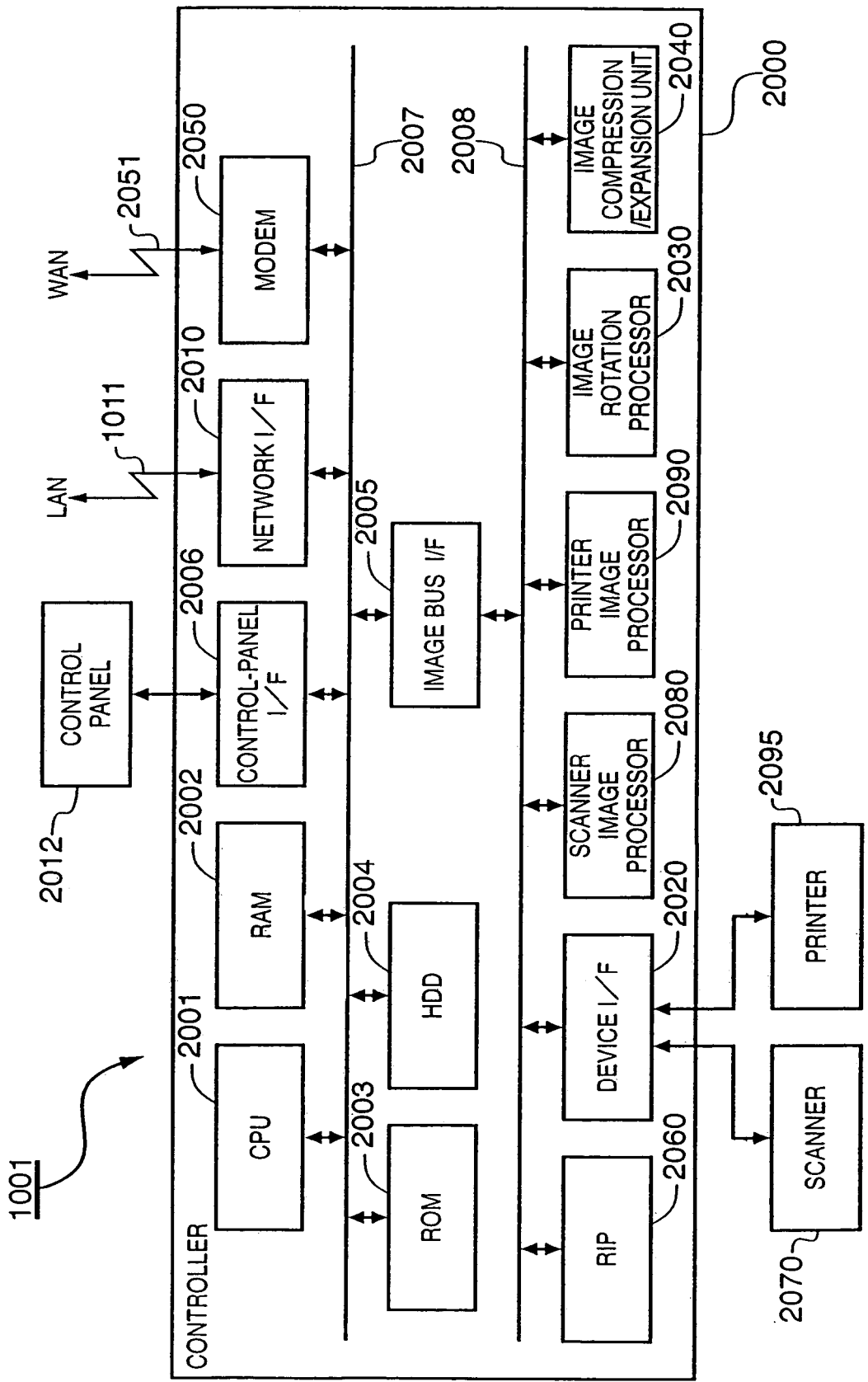
FIG. 2 is a block diagram showing the overall structure of the image processing apparatus according to the embodiment of the present invention.

First, the overall structure of the image processing apparatus 1001 is explained with reference to FIG. 2. Referring to FIG. 2, the apparatus includes a controller 2000, control panel 2012 serving as a user interface (UI), a scanner 2070 serving as an image input device and a printer 2095 serving as an image forming device.

By being connected to the scanner 2070 and the printer 2095 as well as the LAN 1010 or public line (WAN) 2051, the controller 2000 is capable of controlling input and output of image information and device information. A CPU 2001, serving as a controller for controlling the overall system, executes processing according to a control program stored in RAM 2002 or ROM 2003. RAM 2002 is a system work memory for operation of the CPU 2001. This acts as an image memory for storing image data temporarily. ROM 2003 is a boot ROM in which the boot program of the system has been stored. A hard-disk drive (HDD) 2004 stores the system software and image data.

Besides the control program which controls various processing executed by the image processing apparatus 1001 is stored in the RAM 2002 and ROM 2003, the control program may be downloaded from a terminal connected to the LAN 1011 or WAN 2051, or from a storage medium insertable to the image processing apparatus 1001, such as CD-ROM or MO or the like. Alternatively, the control program does not need to be downloaded, but may be executed directly from the aforementioned terminal, CD-ROM, MO, or the like.

A control-panel interface (I/F) 2006, which is for interfacing the control panel 2012, outputs image data to be displayed on the control panel 2012 to the control panel 2012. Another function of the control panel 2012 is to send the CPU 2001 information that the user of the system has entered from the control panel 2012. A modem 2050 is connected to the public line 2051 and serves to input and output information. Further, a network interface 2010 is connected to the LAN 1010 and serves to input and output information. The devices mentioned above are disposed on a system bus 2007.

An image bus interface 2005 is a bus bridge for connecting the system bus 2007 to an image bus 2008, which transfers image data at high speed, and for converting the data structure.

The image bus 2008 is constituted by a PCI bus or IEEE 1394 bus. The devices set forth below are disposed on the image bus 2008.

A raster image processor (RIP) 2060 expands PDL (Page Description Language) code into a bitmap image. A device interface (I/F) 2020 connects the scanner 2070 and printer 2095 to the controller 2000 and subjects the image data to a synchronous/asynchronous conversion. A scanner image processor 2080 subjects input image data, read by the scanner 2070 and input via the device I/F 2020, to correction, manipulation and editing. A printer image processor 2090 subjects image data to be output from the printer to correction and resolution conversion, etc. in correspondence with the printer. An image rotation processor 2030 rotates image data. An image compression/expansion unit 2040 subjects multilevel image data to JPEG compression/decompression processing and subjects binary image data to JBIG, MMR or MH compression/expansion processing.

The printer 2095 is a laser beam printer (LBP) or an inkjet printer or the like, and prints images processed by the image processing apparatus 1001 and character strings.

The arrangement described above is constructed in such a manner that configuration elements connected to the system bus 2007 and configuration elements connected to image bus 2008 are separable from each other taking into consideration of expandability of the image processors. The structure of an ordinary computer is adopted. Making the image bus interface 2005 a general-purpose interface provides a degree of freedom that makes it possible to combine image processing operations at will and also affords expandability for future applications. In particular, the CODEC section (image compression/expansion unit 2040) is connected to the side of the image bus for easy interchangeability in view of the possibility that various standards may be announced in the future.

Figure 3:
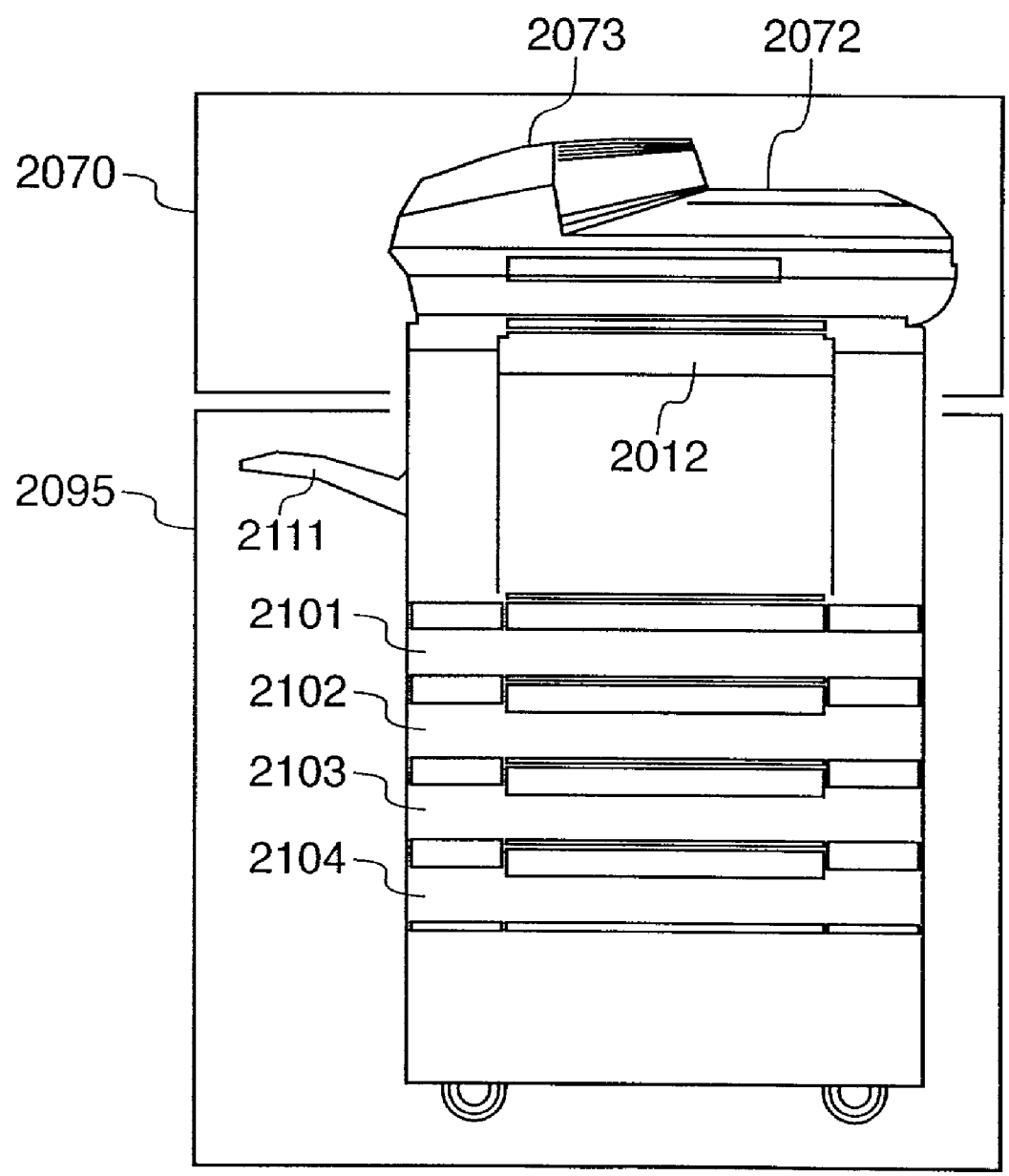
FIG. 3 is a side view showing the external appearance of the image processing apparatus shown in FIG. 2.

FIG. 3 is a side view showing the external appearance of the image processing apparatus 1001.

The scanner 2070, which is the image input device, illuminates an image of an original document and scans the document using a CCD line sensor (not shown) to convert the scanned image into an electric signal representing raster-image data. The original document is placed on a tray 2073 of a document feeder 2072. When the user of the apparatus uses the control panel 2012 to instruct the apparatus to start reading the original document, the CPU 2001 of the controller 2000 applies a command to the scanner 2070. The document feeder 2072 feeds in the original document one sheet at a time so that the document images are read.

The printer 2095 serving as the image output device visualizes (prints) the raster-image data on a recording medium such as paper. Any printing technique may be used in the printer. Examples are electrophotography, which employs a photosensitive drum or belt, or an ink-jet technique, which forms an image directly on paper by jetting ink from an array of micronozzles. The printing operation is started up in response to a command from the CPU 2001. The printer 2095 possesses a plurality of supply bins that make it possible to select printing paper of different sizes or orientations, as well as cassettes 2101, 2102, 2103 and 2104 corresponding to these bins. A drop tray 2111 receives the paper on which printing has been completed.

Figure 4:
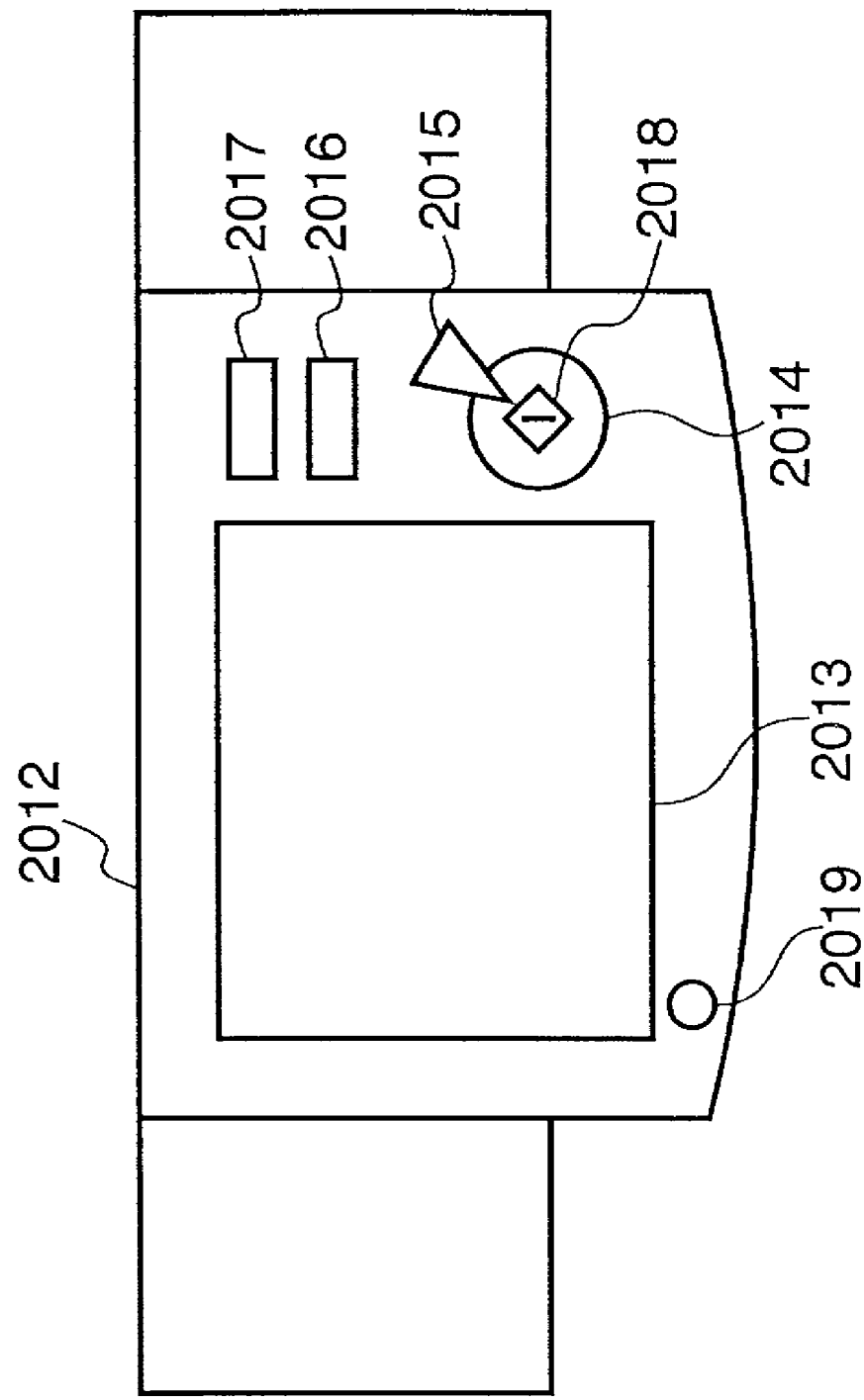
FIG. 4 is an external view of a control panel of the image processing apparatus according to the embodiment of the present invention.

The control panel 2012 is located at a position where the user can easily observe, and an example of the external appearance is shown in FIG. 4. An LCD display unit 2013 includes a touch-sensitive panel sheet affixed to a liquid crystal display and displays a screen for operating the system. Further, if displayed keys are pressed, coordinate data indicative of the corresponding position information is sent to the CPU 2001. Accordingly, the CPU 2001 judges operator's instruction, completing the processing for key depression. The displayed screen is switched according to the circumstances. Note that the control panel 2012 is not limited to an LCD or touch panel, but may be other display device including a CRT or other coordinate-input means operated by a mouse or a pen.

A start key 2014 is used to start reading of a document image. Provided at the center of the start key 2014 is a two color (green and red) LEDs 2018 the color of which indicates whether the start key 2014 is operable. A stop key 2015 is for halting an operation that is currently in progress. An ID key 2016 is used when the user inputs a user ID. A reset key 2017 is used to initialize settings from the control panel. An eco-mode switch key 2019 is used to switch screens between a standard-operation screen and eco-mode operation screen. Eco-mode represents a mode for energy-saving and resource-saving. The aforementioned keys 2014 to 2017, and 2019 are hard keys.

Next, screens displayed on the operation screen 2013 of the control panel 2012 of the embodiment, and a setting method of the screens are described with reference to drawings of the display screens and flowcharts.

First, switching operation between the standard-operation screen and eco-mode operation screen according to the present embodiment is described with reference to FIG. 5.

At step S401, it is determined whether the selected screen is the standard-operation screen shown in FIG. 7 which will be described later, or the eco-mode operation screen shown in FIG. 8 which will be described later. When the standard-operation screen is selected, the control proceeds to step S402 where it is determined whether or not the eco-mode switch key 2019 is depressed. When the switch key 2019 is depressed, the screen is switched to the eco-mode operation screen at step S403, whereas when the switch key 2019 is not depressed, the control ends without switching the screen.

Meanwhile, when the eco-mode operation screen is selected at step S401, it is determined whether or not the eco-mode switch key 2019 is depressed at step S404. When the switch key 2019 is depressed, the screen is switched to the standard-operation screen at step S405, whereas when the switch key 2019 is not depressed, the control ends without switching the screen.

Figure 7:
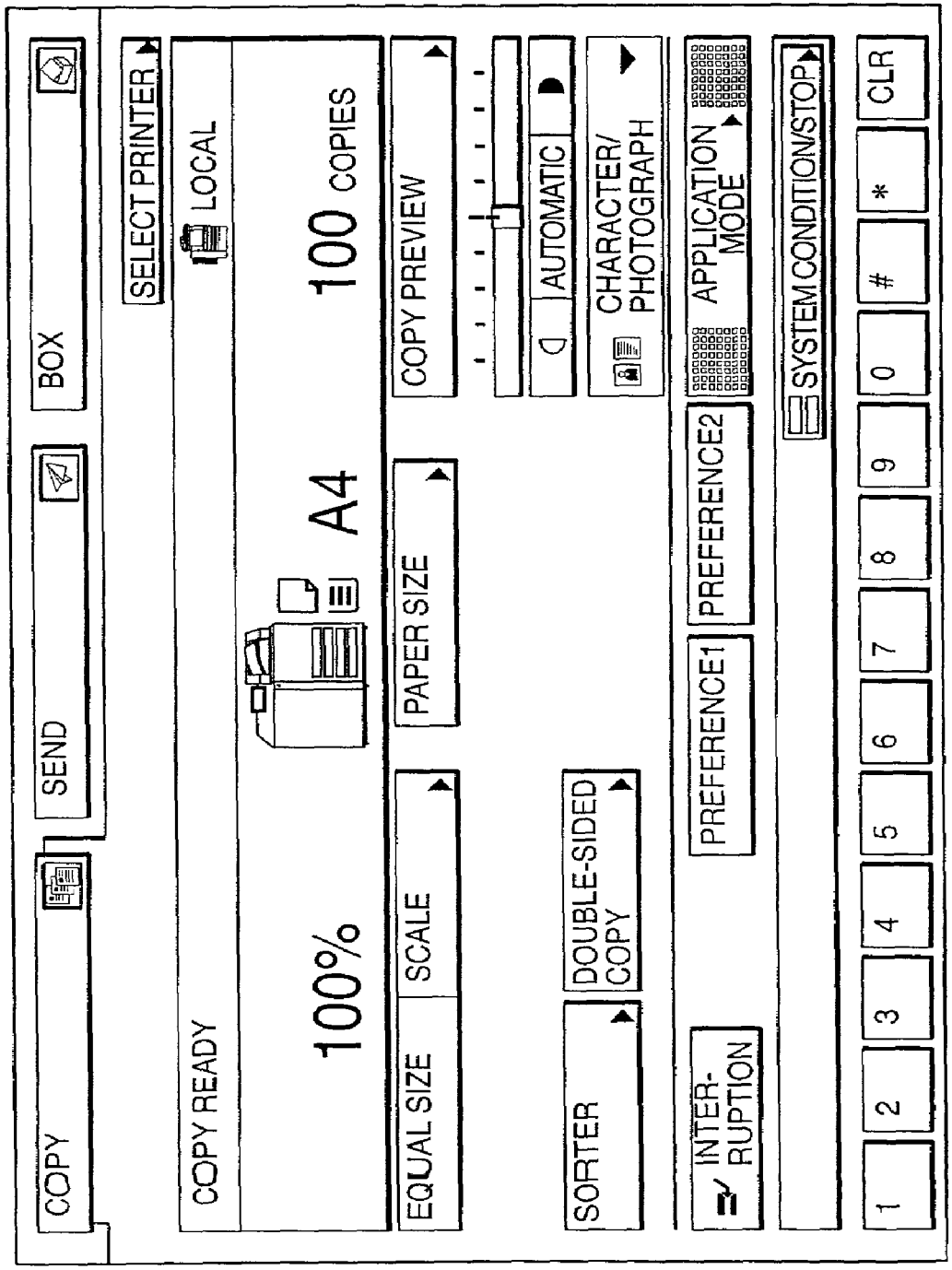
FIG. 7 is a view showing a standard-operation screen displayed in a display unit according to the embodiment of the present invention.

FIG. 7 shows the standard-operation screen displayed on the LCD display unit 2013 of the control panel 2012. When the eco-mode switch key 2019 is depressed, the screen is switched to the eco-mode operation screen shown in FIG. 8. The following functions can be set in this screen.

Paper-saving setting keys 701, 702, and 703 are provided for setting a saving rate of an output paper with respect to a read original document. A toner-saving setting key 704 sets a toner-saving mode. An eco-check key 705 calls up a screen that allows visual confirmation of an energy-saving/resource-saving level of the copying machine with the use of a graph. An eco-guide key 706 calls up a screen that allows easy setting of paper saving or toner saving according to guidance. A scale setting key 707 is provided for setting an enlargement/reduction rate. A paper selection key 708 is provided for selecting a size of output paper. A copy preview key 709 is for instructing to read an image of an original document by the scanner 2070 upon depression of the key 709, which allows confirmation by displaying an output preview reflecting various settings. A sorter key 710 sets various sorting options. An application mode key 711 is provided for setting various application modes.

Displayed in the center of the screen is a setting preview 712, and above the setting preview 712 is the machine's current status 713. Previews displayed in the setting preview 712 include the paper-saving setting preview 714, toner-saving preview 715, scale indicator 716, selected paper cassette indicator 717, paper size indicator 718, copying number indicator 719, and sorter setting indicator 720.

After switching the standard-operation screen to eco-mode operation screen, the ½ paper-saving mode (single-sided portrait→double-sided portrait) and toner-saving mode (fine edge draft) are selected as an initial state. In the drawing of FIG. 8, the ½ paper-saving key 701 and toner-saving key 704 are shown differently from other keys, e.g., in different color of the keys, so as to be easily recognized as selected keys. The details of the settings 714 and 715 are displayed in the setting preview 712. Furthermore, FIG. 8 shows a case in which a user designates staple sorting. Therefore, the sorter designation 720 is displayed on the screen, and the sorter key is indicated in a different color so as to be easily recognized as a selected key.

Figure 9:
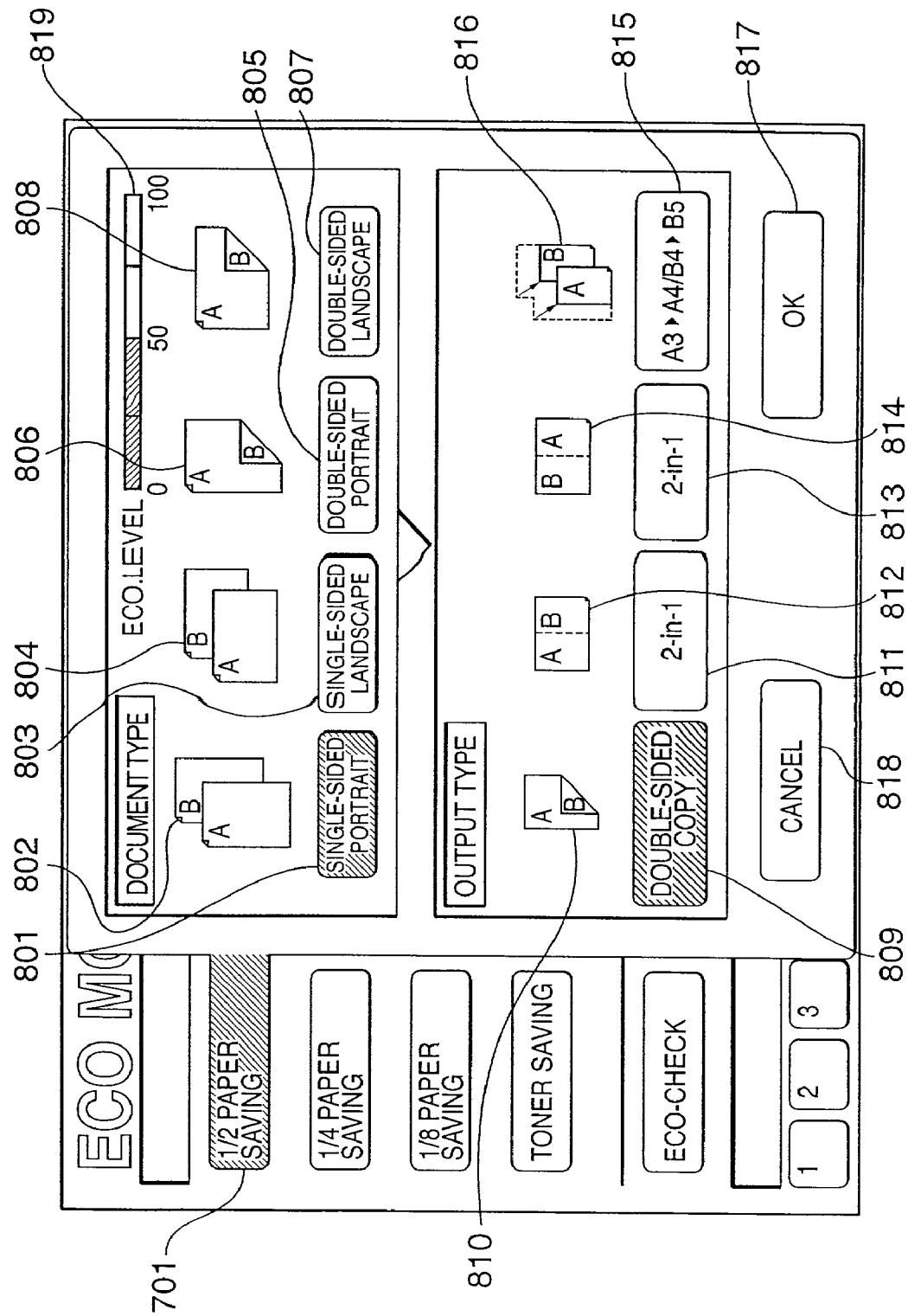
FIG. 9 is a view showing a screen displayed in the display unit when the ½ paper-saving mode is selected and an original document is a single-sided portrait according to the embodiment of the present invention.

FIG. 9 shows a screen displayed when the ½ paper-saving key 701 is depressed. In this screen, an original document type is arranged in the upper portion of the screen and an output type is arranged in the lower portion of the screen.

When the ½ paper-saving mode is selected, displayed on the screen are only the settings which enable to reduce the quantity of output paper to half the quantity of original documents wherein the quantity of output paper is reduced by the quantity of output paper and/or the size of output paper. Therefore, the displayed output types change according to an original document type in a way that the quantity of output paper becomes half. In a case where the quantity of original documents is an odd number, only the fraction is printed in one sheet. Therefore, to be exact, the outputted quantity of pages is larger than a half. However, it will be expressed as "half" for explanatory convenience (and sometimes, the outputted quantity may be referred to as being "substantially half", and similarly, "substantially ¼", etc., in other modes described below).

In the default screen of the ½ paper-saving key 701 being depressed, a single-sided portrait 801 is selected as an original document type and a double-sided copy 809 is selected as an output type. These keys are indicated differently from other keys, e.g., in different colors, so as to be easily recognized as selected keys. The original document type subjected to reading can be selected from the single-sided portrait 801, single-sided landscape 803, double-sided portrait 805, and double-sided landscape 807. The output type can be selected from the double-sided copy 809, 2-in-1 copy 811, 2-in-1 copy 813, and A3→A4/B4→B5 reduction 815. In the upper portion of the screen, previews (802, 804, 806, 808, 810, 812, 814, 816) of the respective keys are displayed.

An eco-level indicator 819 visually indicates an energy-saving/resource-saving level of the ½ paper-saving mode.

An OK key 817 approves the setting. A setting cancel key 818 cancels the paper-saving function. When the setting cancel key 818 is depressed, the image forming apparatus returns to the initial setting.

Figure 10:
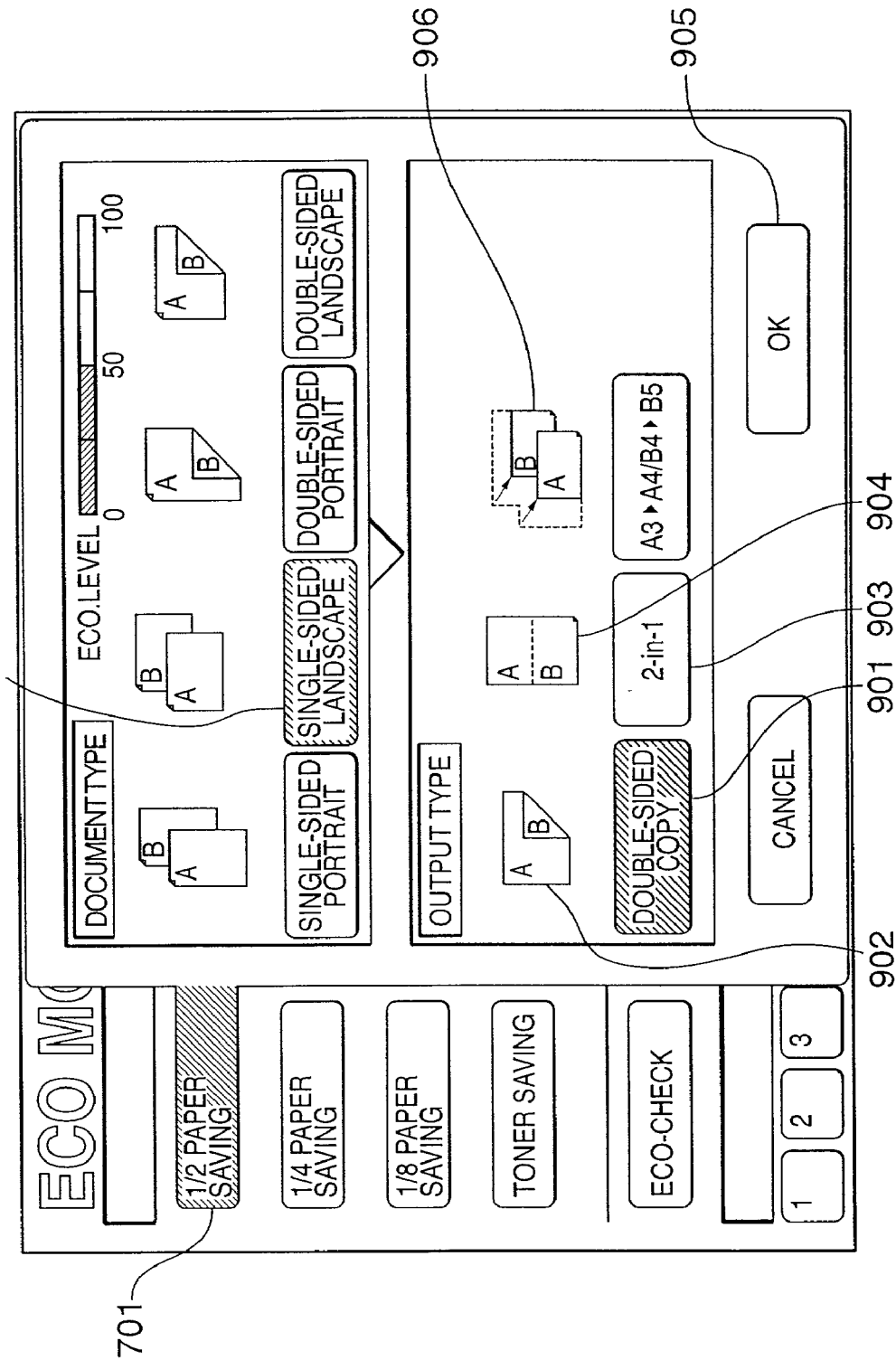
FIG. 10 is a view showing a screen displayed in the display unit when the ½ paper-saving mode is selected and an original document is a single-sided landscape according to the embodiment of the present invention.

FIG. 10 shows a screen displayed when the ½ paper-saving mode is selected, and the single-sided landscape 803 is selected as the original document type. The original document types and displayed preview are the same as that shown in FIG. 9. The output type can be selected from the double-sided copy 901, 2-in-1 copy 903, and A3→A4/B4→B5 reduction 905. Previews (902, 904, 906) are displayed above the respective keys.

In the default screen of the single-sided landscape key 803 being depressed, the single-sided landscape key 803 and the double-sided copying key 901, which is selected as the initial state of the output type, are indicated differently from other keys, e.g., in different colors, so as to be easily recognized as selected keys.

Figure 11:
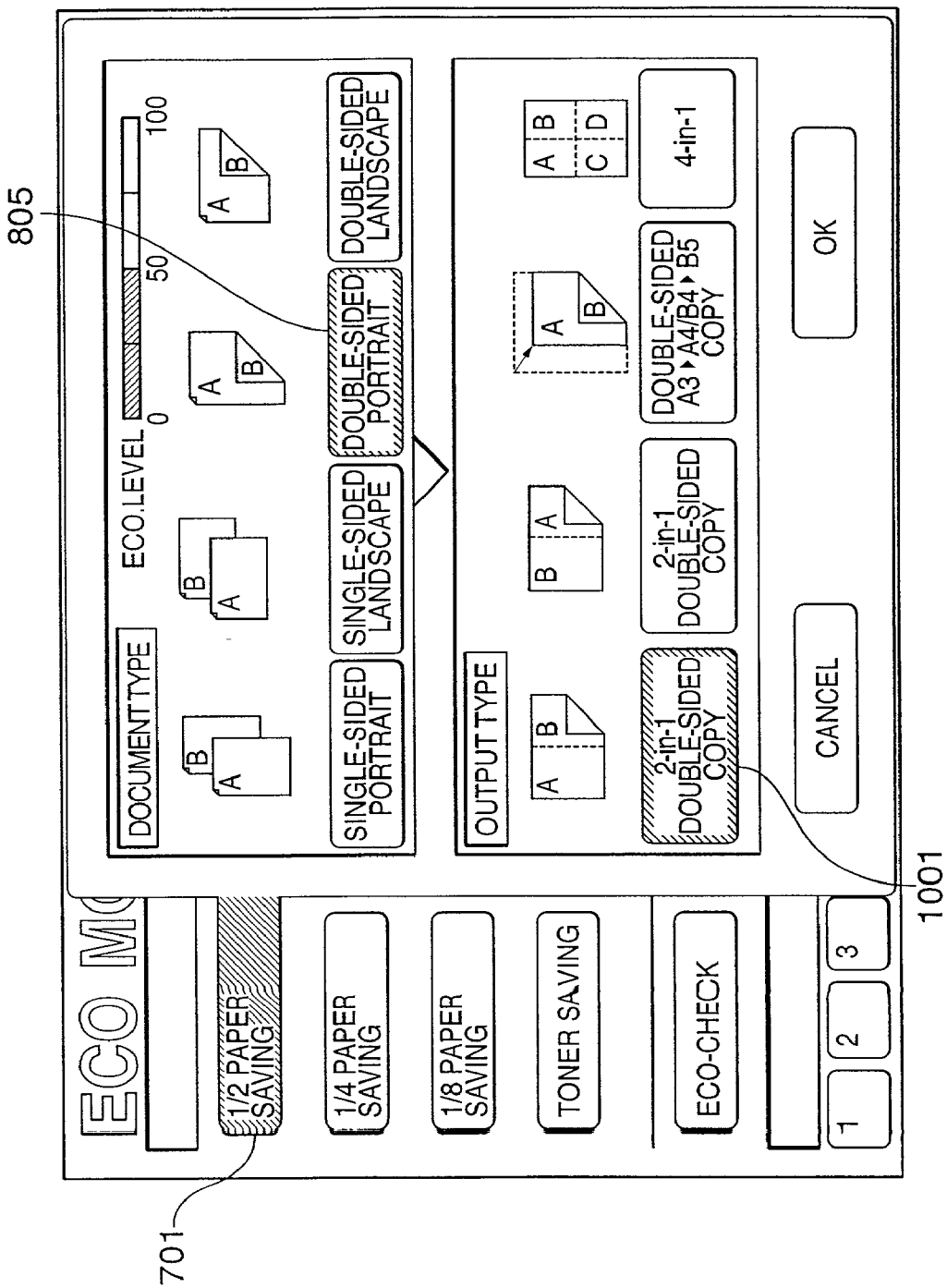
FIG. 11 is a view showing a screen displayed in the display unit when the ½ paper-saving mode is selected and an original document is a double-sided portrait according to the embodiment of the present invention.

FIG. 11 shows a screen displayed when the ½ paper-saving mode is selected, and the double-sided portrait 805 is selected as the original document type. In the initial state, 2-in-1 double-sided copy 1001 is selected as an output type.

Figure 12:
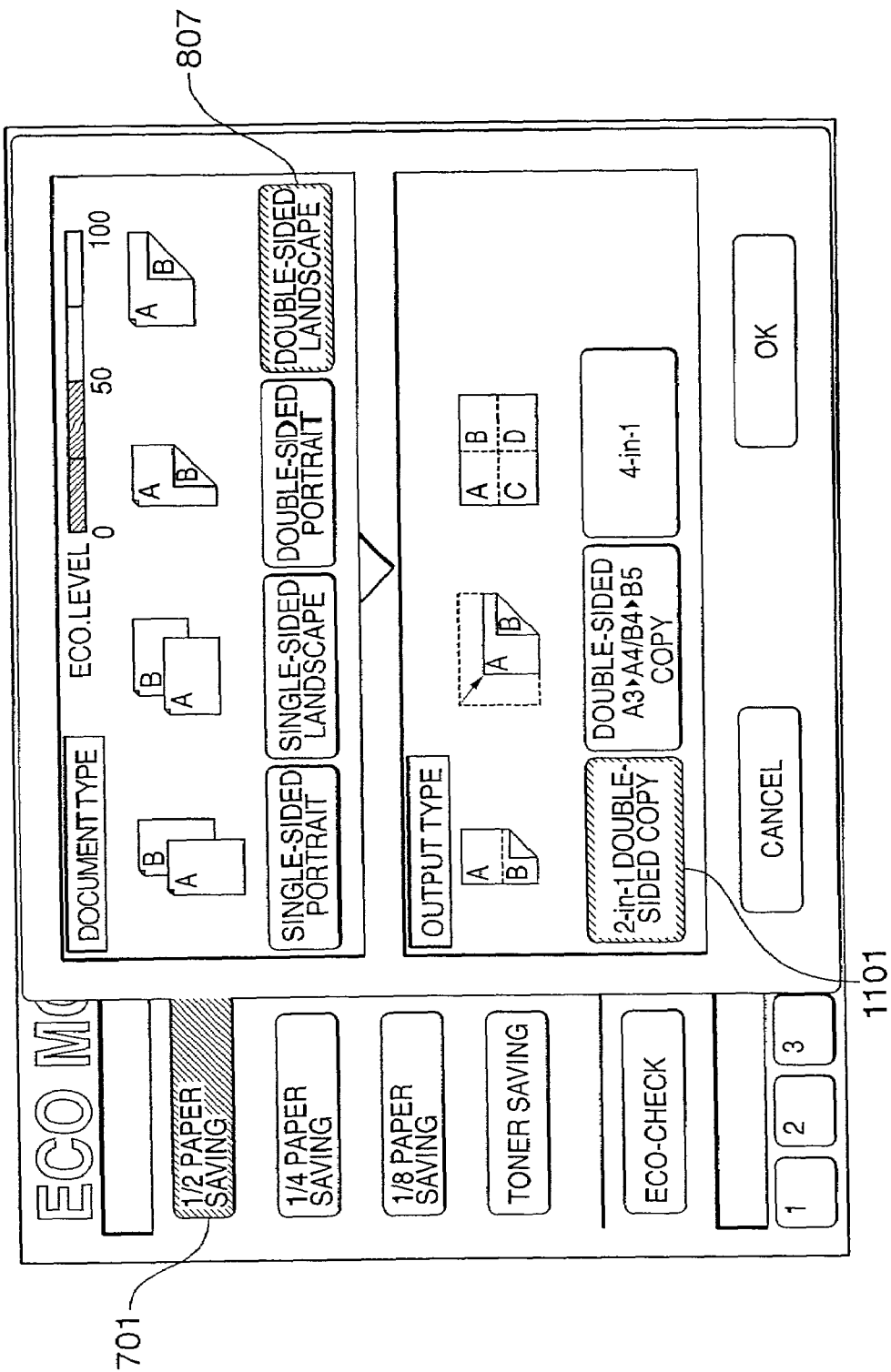
FIG. 12 is a view showing a screen displayed in the display unit when the ½ paper-saving mode is selected and an original document is a double-sided landscape according to the embodiment of the present invention.

FIG. 12 shows a screen displayed when the ½ paper-saving mode is selected, and the double-sided landscape 807 is selected as the original document type. In the initial state, 2-in-1 double-sided copy 1101 is selected as an output type. Settings which enable to reduce the quantity of output paper to half the quantity of original documents are displayed as an output type.

Figure 13:
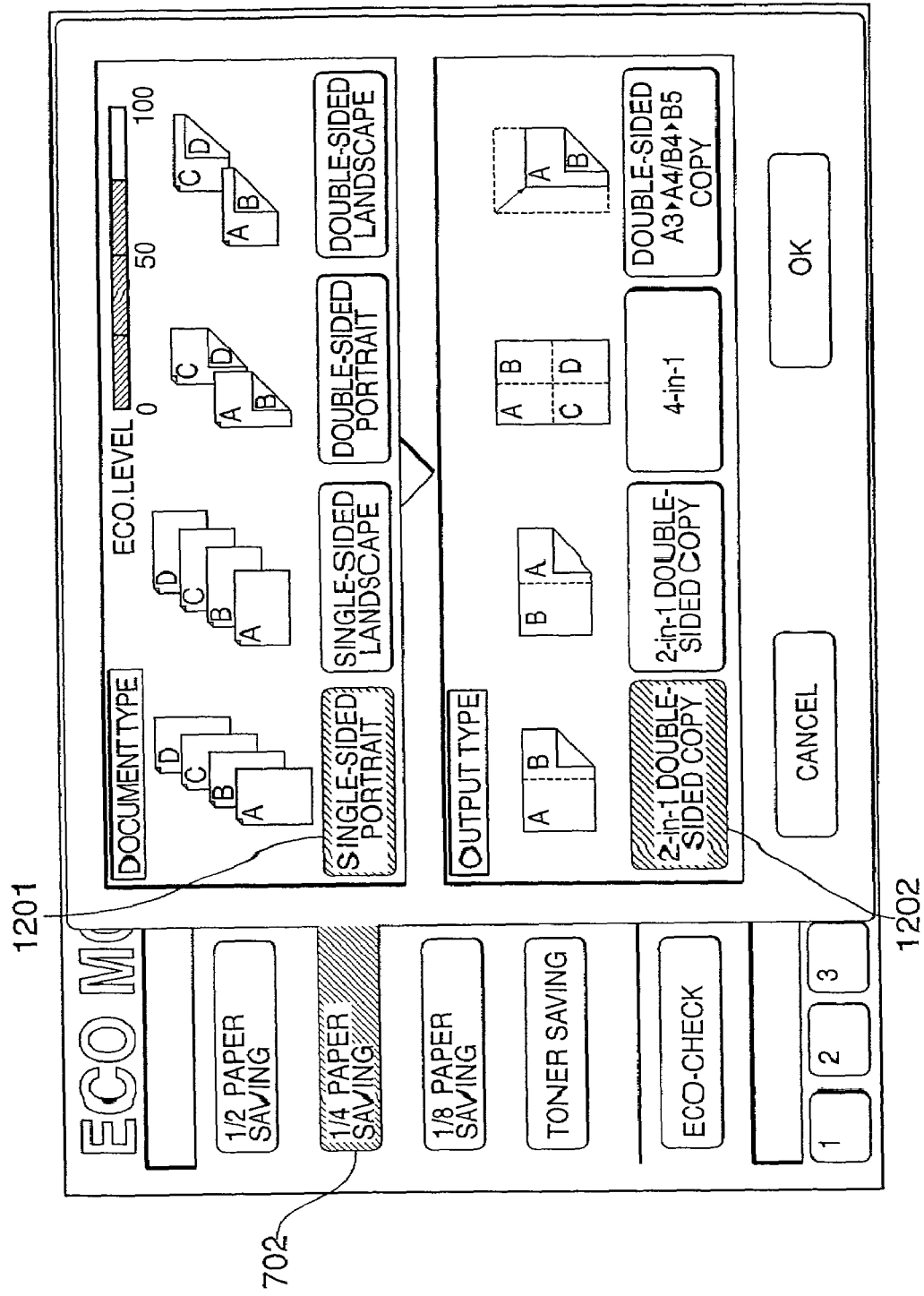
FIG. 13 is a view showing a screen displayed in the display unit when the ¼ paper-saving mode is selected and an original document is a single-sided portrait according to the embodiment of the present invention.

FIG. 13 shows a screen displayed when the ¼ paper-saving key 702 is depressed. When the ¼ paper-saving mode is selected, displayed on the screen are only the previews and setting keys which enable to reduce the quantity of output paper to ¼ of the quantity of original documents. Note that in a case where the quantity of original documents is not a multiple of 4, the fraction is printed in one sheet. Therefore, to be exact, the outputted quantity of pages is larger than ¼. However, it will be expressed as ¼ for explanatory convenience. In the initial state, the single-sided portrait 1201 and 2-in-1 double-sided copy 1202 are selected respectively as the original document type and output type. Based on the selected original document type, methods which enable to reduce the quantity of output paper to ¼ of the quantity of original documents are displayed as an output type.

Figure 14:
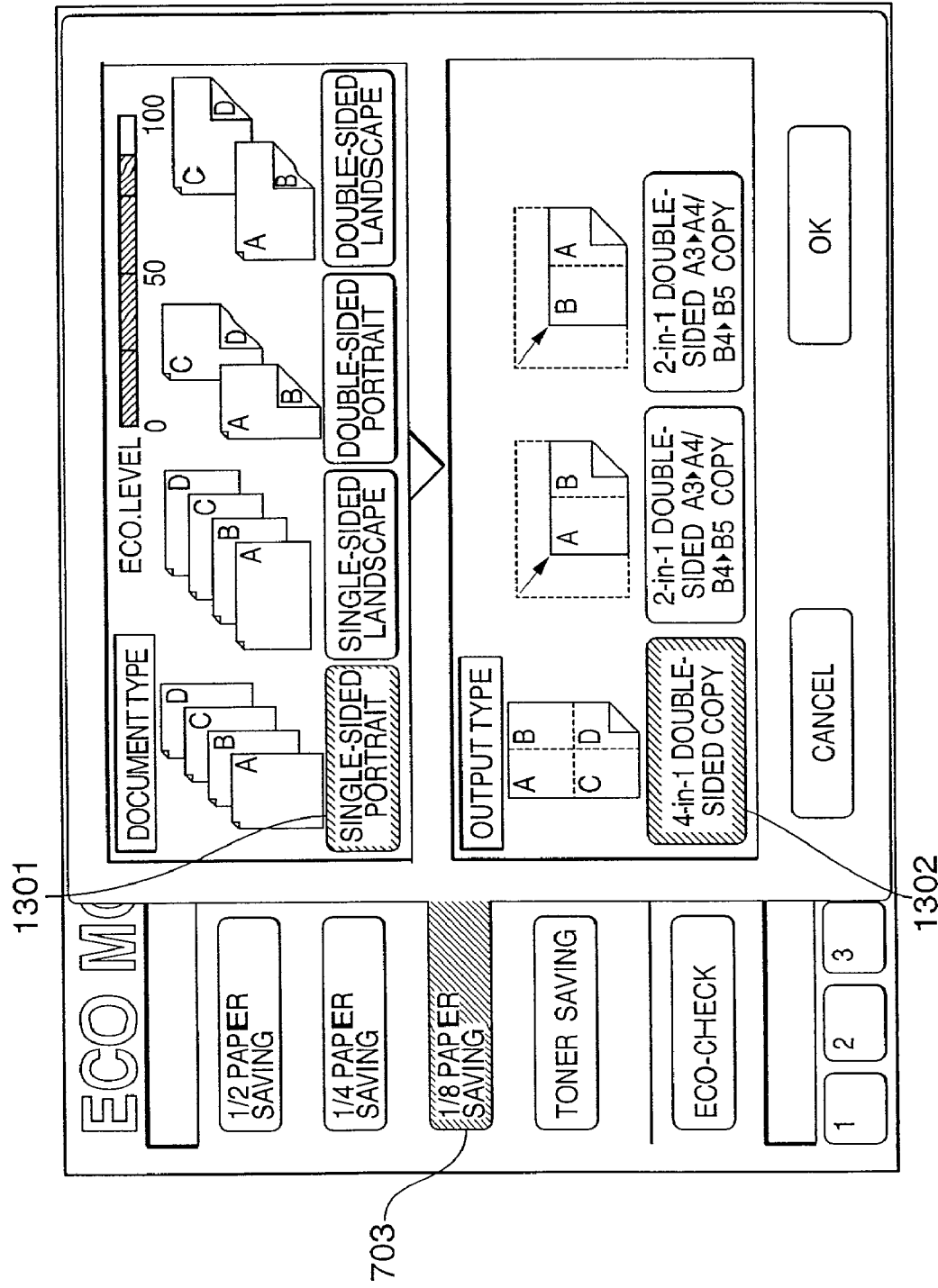
FIG. 14 is a view showing a screen displayed in the display unit when the ⅛ paper-saving mode is selected and an original document is a single-sided portrait according to the embodiment of the present invention.

Similarly, FIG. 14 shows a screen displayed when the ⅛ paper-saving key 703 is depressed. When the ⅛ paper-saving mode is selected, displayed on the screen are only the previews and setting keys which enable to reduce the quantity of output paper to ⅛ of the quantity of original documents. Note that in a case where the quantity of original documents is not a multiple of 8, the fraction is printed in one sheet. Therefore, to be exact, the outputted quantity of pages is larger than ⅛. However, it will be expressed as ⅛ for explanatory convenience. In the initial state, the single-sided portrait 1301 and 4-in-1 double-sided copy 1302 are selected respectively as the original document type and output type.

Also in the screens shown in FIGS. 11 to 14, selected keys are indicated differently from other keys, e.g., in different colors, so as to be easily recognized as selected keys.

Figure 6:
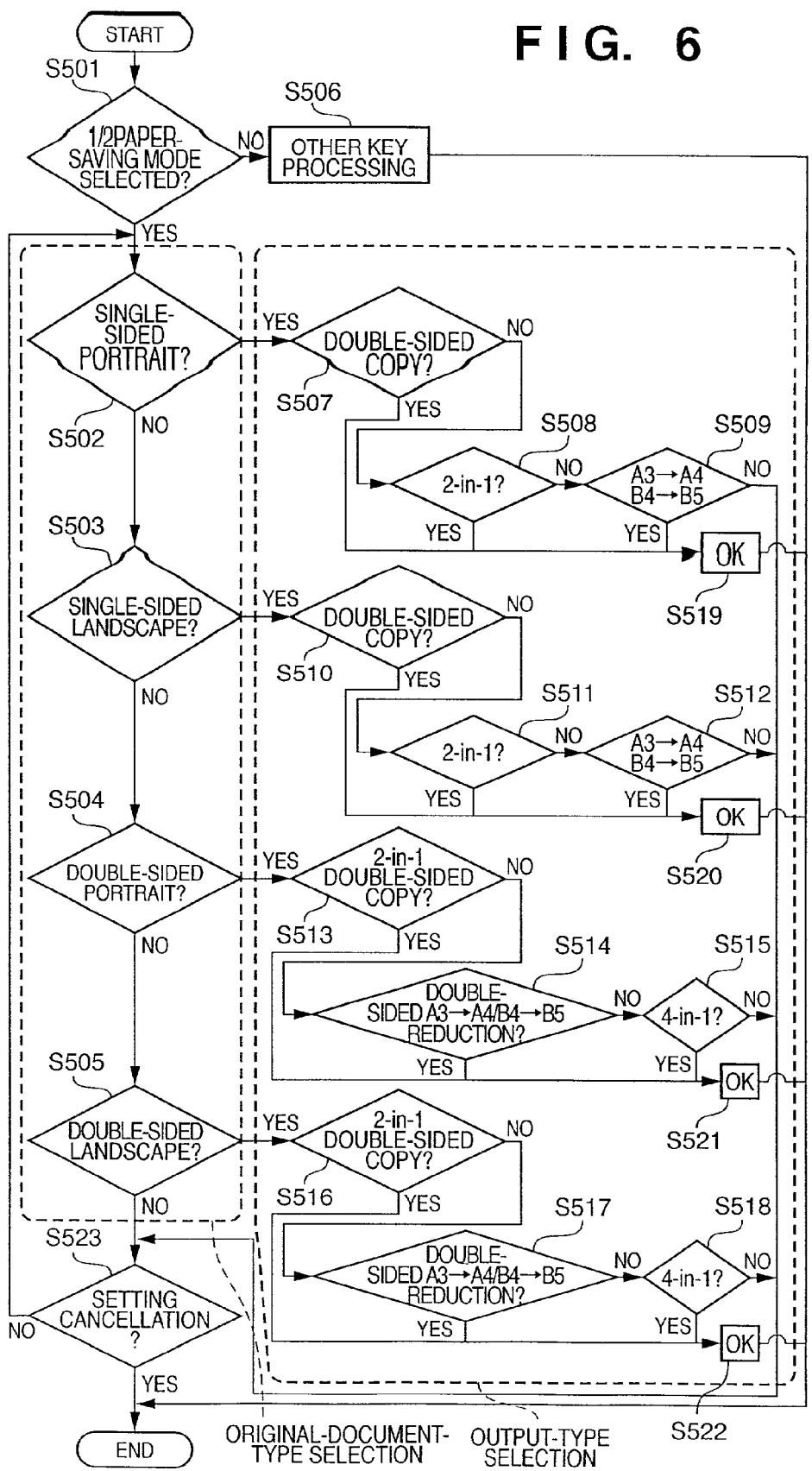
FIG. 6 is a flowchart showing steps of selecting a ½ paper-saving mode according to the embodiment of the present invention.

FIG. 6 is a flowchart showing steps of setting in the ½ paper-saving mode. When other keys, e.g., ¼ paper-saving mode, ⅛ paper-saving mode, or toner-saving mode, are selected (NO at step S501), the control proceeds to other key processing (step S506).

The processing steps are largely divided in two blocks: the original-document-type selection steps and output-type selection steps. An original document type is selected first, thereafter an output type is selected.

Since these steps are common to the settings in ½ paper-saving mode, ¼ paper-saving mode, and ⅛ paper-saving mode, the ½ paper-saving mode setting is described as an example.

When the ½ paper-saving key is selected (YES at step S501), an original document type is selected. Selection is made from the single-sided portrait (YES at step S502), single-sided landscape (YES at step S503), double-sided portrait (YES at step S504), and double-sided landscape (YES at step S505). The single-sided portrait key is selected as a default setting. If the setting is to be cancelled at this stage, the setting cancel key 818 is depressed for cancellation (YES at step S523).

When key selection is made in the original-document-type selection, the screen displays the output-type selection keys and previews, corresponding to the selected original document type, as described above with reference to FIGS. 9 to 12.

When the single-sided portrait is selected as the original document type (YES at step S502), selection is made from the double-sided copy (YES at step S507), 2-in-1 copy (YES at step S508), and A3→A4/B4→B5 reduction (YES at step S509). Then, the OK key 817 is depressed to complete the setting (step S519). When the setting is to be cancelled at this stage, the setting cancel key 818 is depressed for cancellation (step S523).

Similarly, when one of the single-sided landscape (step S503), double-sided portrait (step S504), and double-sided landscape (step S505) is selected as the original document type, selection is made from the output-type selection keys shown in FIGS. 10 to 12 (steps S510 to S518), and the OK key 817 is depressed to complete the setting (steps S520 to S522).

Figure 8:
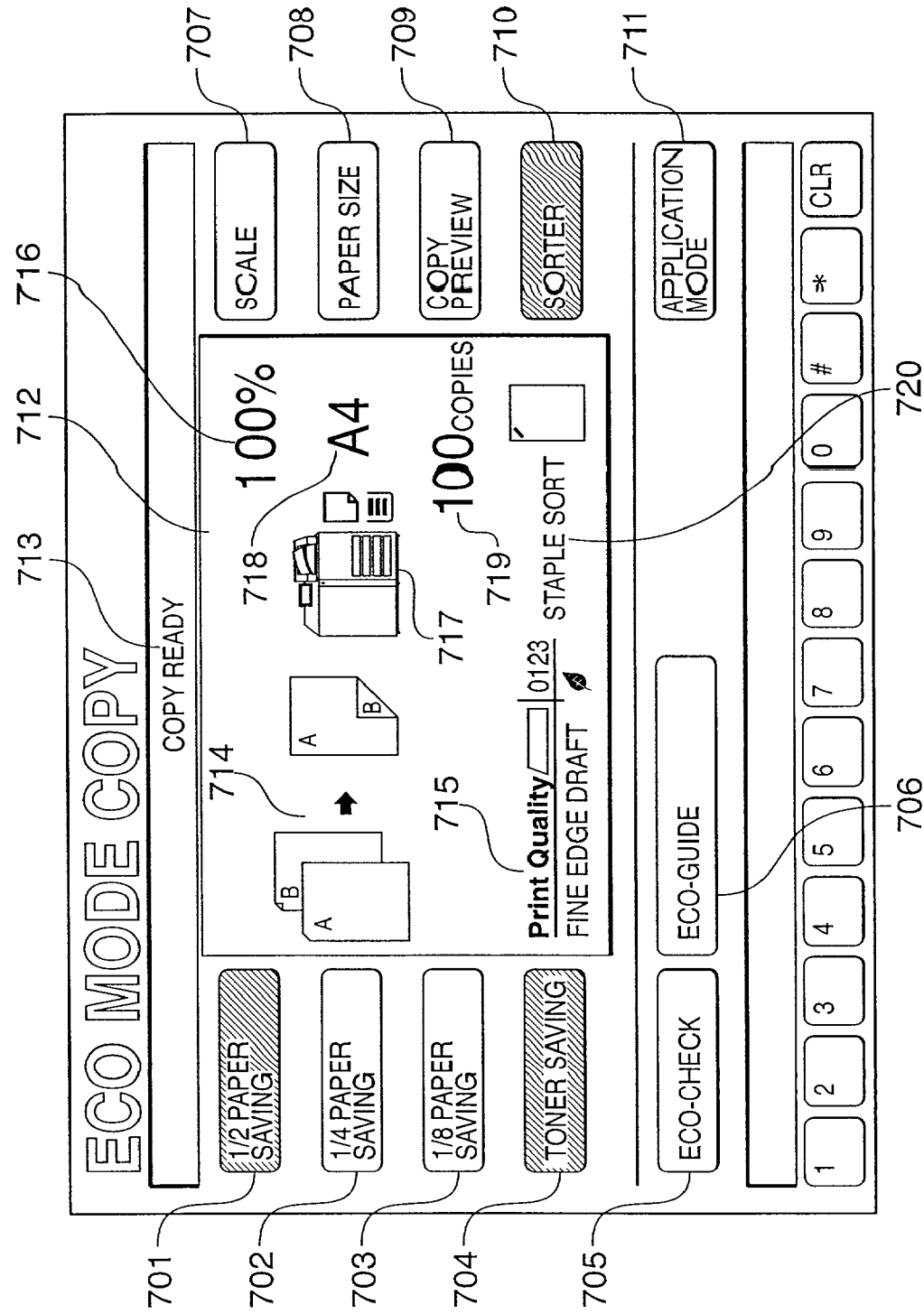
FIG. 8 is a view showing an eco-mode operation screen displayed in the display unit according to the embodiment of the present invention.

Upon completion of the setting, the screen returns to the screen shown in FIG. 8, and the set preview is displayed in the paper-saving setting preview area 714 of the setting preview area 712 in the center of the screen.

Figure 15:
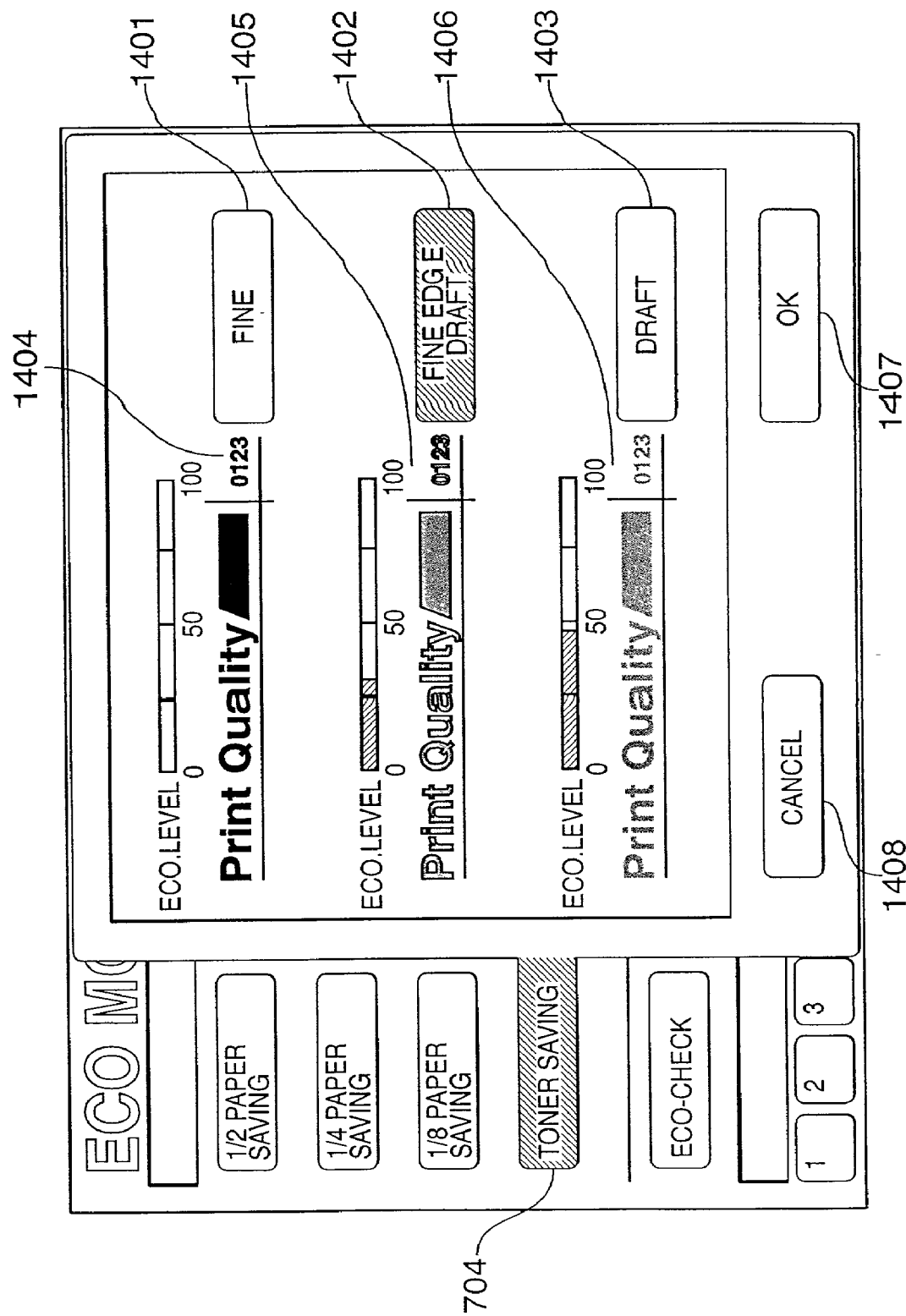
FIG. 15 is a view showing a screen displayed in the display unit when a toner-saving mode is selected according to the embodiment of the present invention.
Figure 16:
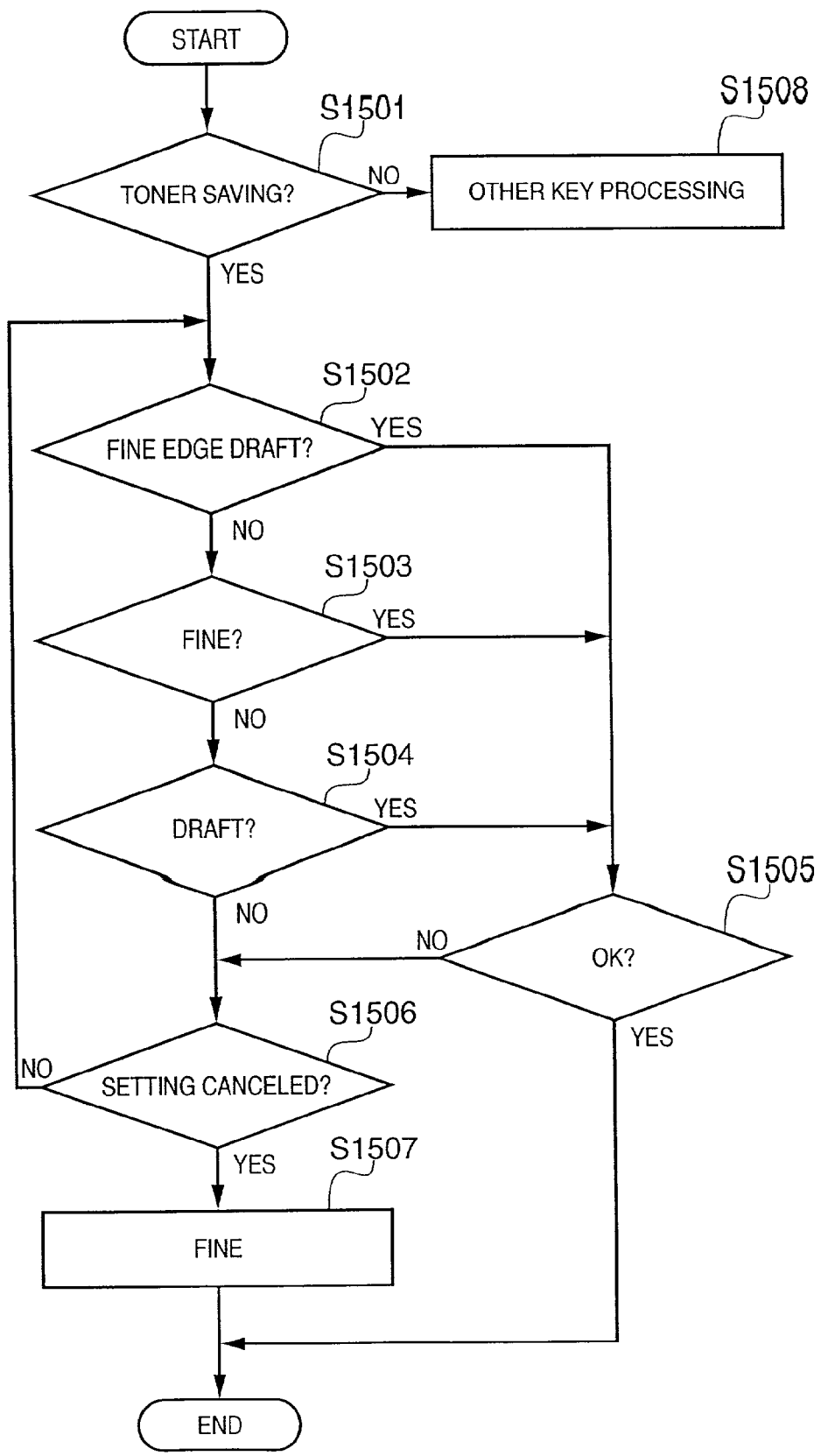
FIG. 16 is a flowchart showing steps of selecting the toner-saving mode according to the embodiment of the present invention.

FIG. 15 shows a screen displayed when the toner-saving key 704 is depressed on the eco-mode operation screen in FIG. 8. FIG. 16 is a flowchart showing steps of toner-saving-mode setting. When other keys, e.g., ½ paper-saving mode, ¼ paper-saving mode, or ⅛ paper-saving mode, are selected (NO at step S1501), the control proceeds to other key processing (step S1508).

When the toner-saving key 704 is depressed (YES at step S1501), the control proceeds to step S1502. In the example shown in FIG. 15, "fine edge draft" is selected as an initial state. Therefore, the toner-saving key 704 and fine edge draft key 1402 are indicated differently from other keys, e.g., in different colors, so as to be easily recognized as selected keys.

Depressing a fine key 1401 (YES at step S1503) selects a "fine" toner mode, which is a regular mode that has no toner-saving effect. The print image and eco-level achieved in this mode are displayed as a preview (1404) on the left of the fine key 1401. Depressing a fine edge draft key 1402 (YES at step S1502) selects the toner mode "fine edge draft," enabling to print clear edges of characters or graphics and print solid filled areas lighter than in the fine mode. The print image and eco-level achieved in this mode are displayed as a preview (1405) on the left of the fine edge draft key. Depressing a draft key 1403 (YES at step S1504) selects a "draft" toner mode, enabling to suppress toner consumption in the entire image and print the entire image lighter than in the fine mode. The print image and eco level achieved in this mode are displayed as a preview (1406) on the left of the draft key.

Upon completion of the setting selection, an OK key 1407 is depressed (YES at step S1505) to complete the setting. If a setting cancel key 1408 is depressed (YES at step S1506) instead of depressing the OK key 1407 (NO at step S1505), the fine mode (no toner saving) is set at step S1507, and the control ends.

Upon completion of the setting, the screen returns to the screen shown in FIG. 8, and the set preview is displayed in the toner-save setting preview area 715 of the setting preview area 712 in the center of the screen.

Figure 17:
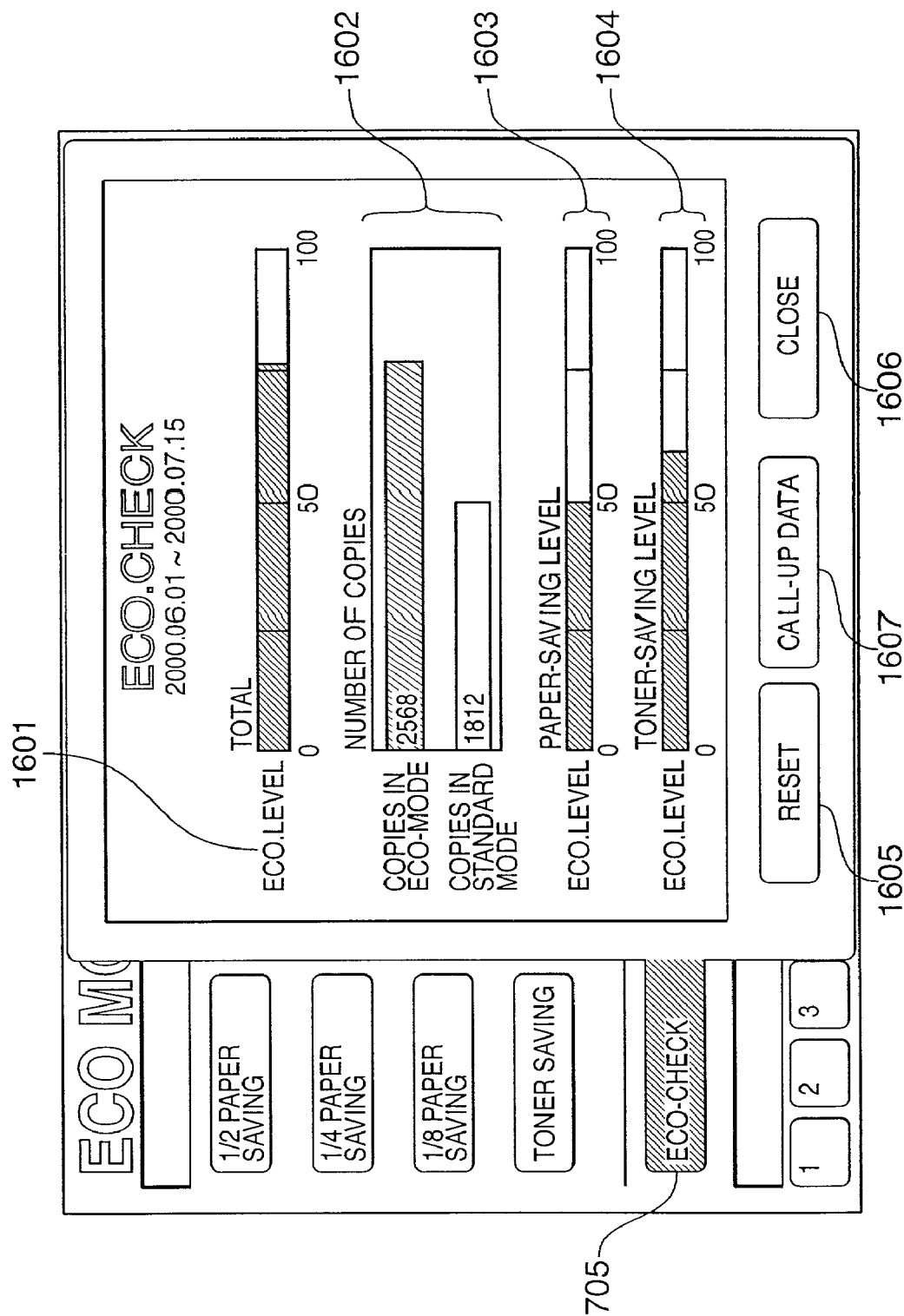
FIG. 17 is a view showing a screen displayed in the display unit when an eco-check screen is selected according to the embodiment of the present invention.

FIG. 17 shows a screen displayed when an eco-check key 705 is depressed on the eco-mode operation screen in FIG. 8. The eco-check key 705 is indicated differently from other keys, e.g., in different color, so as to be easily recognized as a selected key.

This screen enables a user to visually confirm with a graph how much energy-saving/resource-saving effects have been achieved based on the copy log in the past.

Referring to FIG. 17, an eco-level indicator 1601 indicates a level of overall energy-saving/resource-saving effects, which is obtained by performing arbitrary coefficient processing on the counts in the copy log, such as the output quantity of paper or toner designated to save. A copying number indicator 1602 counts the numbers of copies outputted in the eco-mode and standard mode respectively based on the copy log, and indicates the numbers by the graphs. A paper-saving level indicator 1603 calculates based on the copy log a percentage of the number of copies outputted in the paper-saving mode with respect to the total number of copies, and indicates the percentage by the graph.

Figure 25:
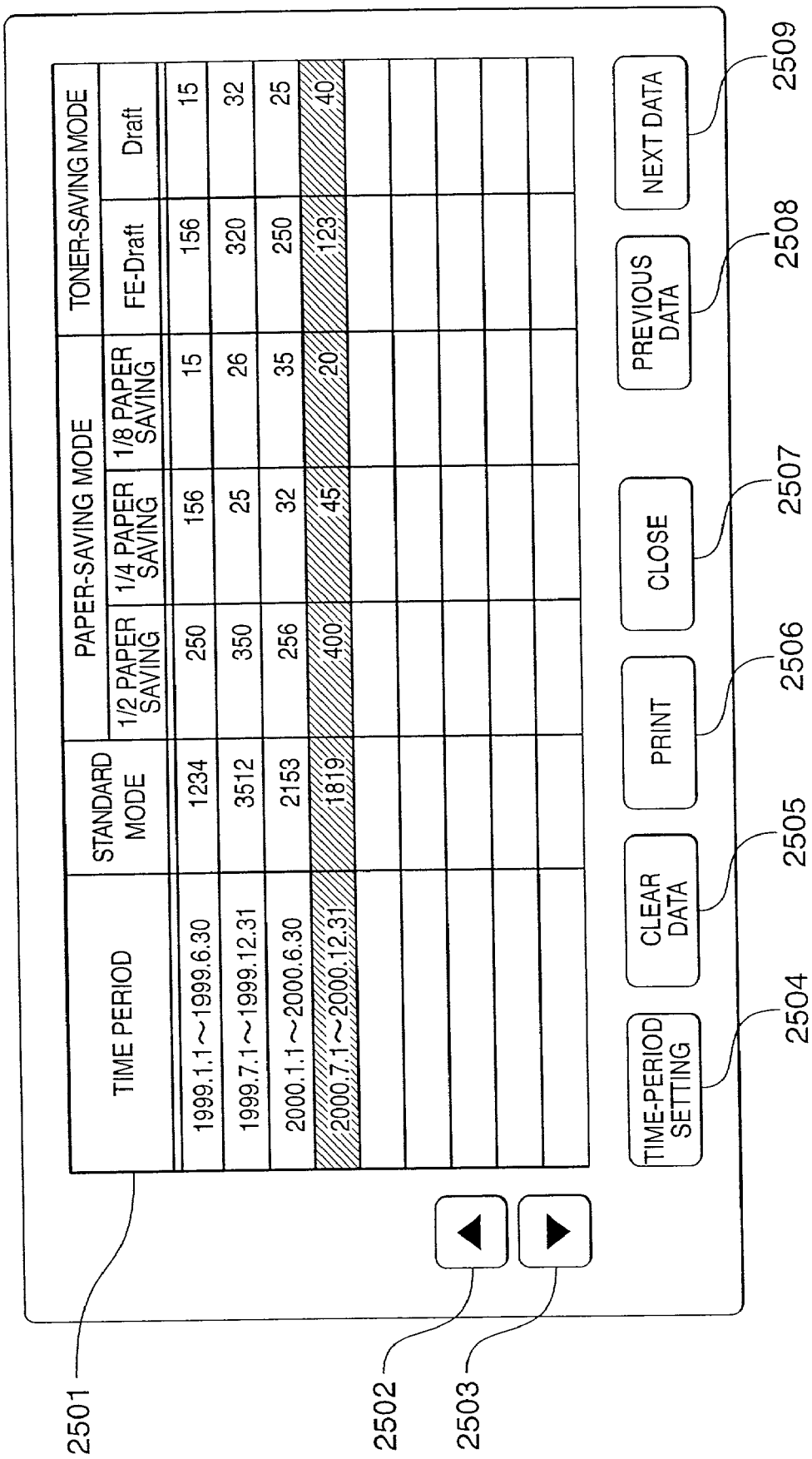
FIG. 25 is a view showing a screen displayed in the display unit when a data call-up key is selected in the eco-check screen according to the embodiment of the present invention.

A toner-saving level indicator 1604 calculates based on the copy log a percentage of the number of copies outputted in the toner-saving mode with respect to the total number of copies, and indicates the percentage by the graph. Depressing a reset key 1605 resets the counts in the copy log, and displays the initial state. When a data call-up key 1607 is depressed, the screen shown in FIG. 25 is displayed. Depressing a close key 1606 closes the current screen and displays the screen in FIG. 8.

FIG. 25 shows a screen displayed when the data call-up key 1607 is depressed.

In FIG. 25, a table 2501 indicates the number of copies outputted in each mode. The log data in the paper-saving mode and toner-saving mode are counted for a given time period, and the counted numbers are displayed. Time-period select keys 2502 and 2503 are provided for selecting one of the time periods. A time-period setting key 2504 is provided for setting a desired time period to be counted. A data clear key 2505 deletes log data in a selected time period. A print key 2506 prints out the table 2501. A close key 2507 is provided for closing this screen and returning to the eco-check screen in FIG. 17. When a time period is selected by the time-period select keys 2502 and 2503 and the close key 2507 is depressed, the counted result for the selected period is displayed as shown in FIG. 17. The previous data key 2508 and next data key 2509 are used in a case where the table 2501 includes data other than the currently displayed period. These keys are used to display the past log data.

Figure 18:
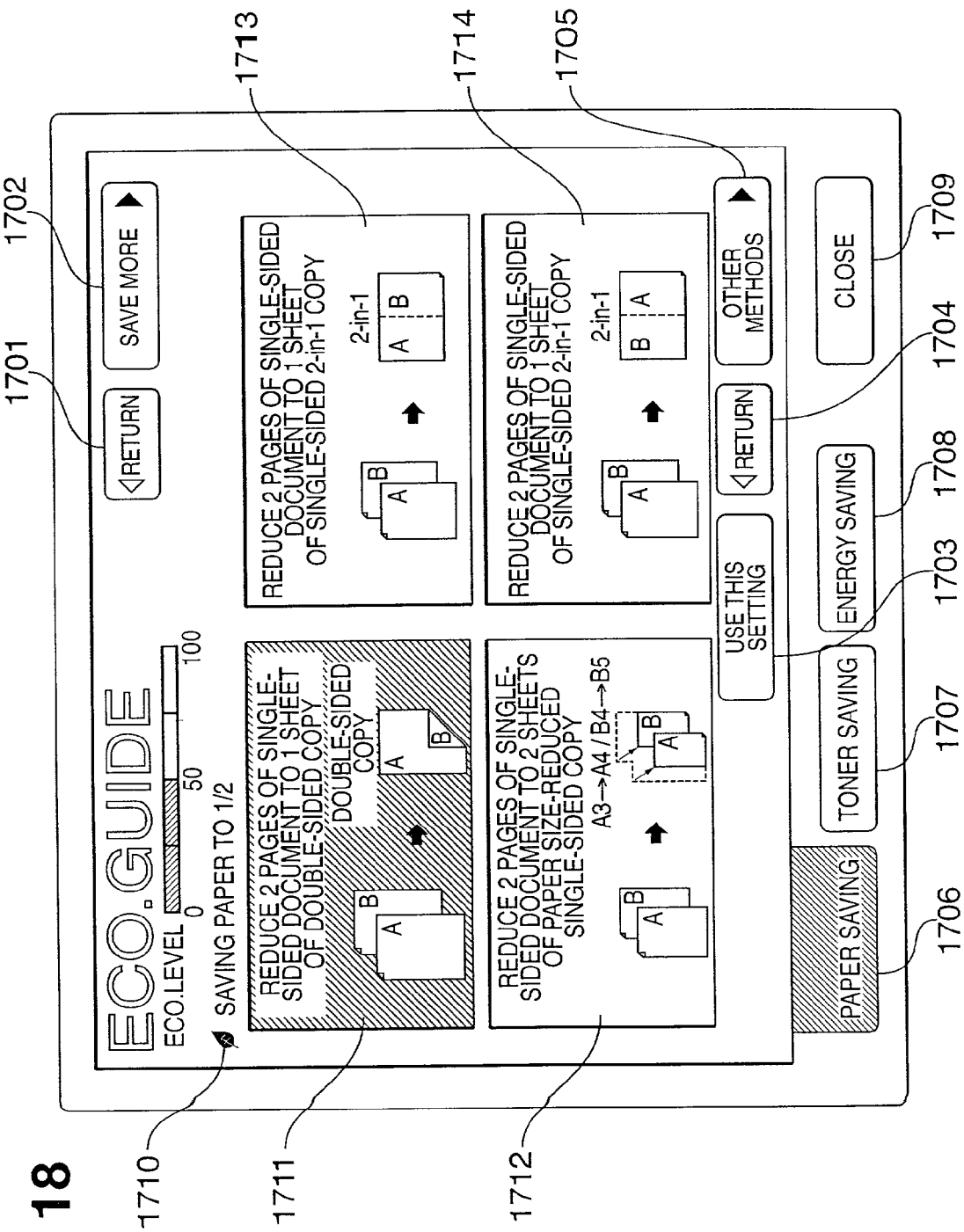
FIG. 18 is a view showing an eco-guide screen displayed in the display unit according to the embodiment of the present invention, wherein the ½ paper-saving mode is selected and an original document is a single-sided portrait in the eco-guide screen.

FIG. 18 shows a screen displayed when the eco-guide key 706 is depressed on the eco-mode operation screen in FIG. 8. The eco-guide enables a user who does not know the eco-mode functions to perform setting on the eco-mode operation screen with help guidance, thereby enabling easy energy-saving/resource-saving setting.

Keys 1706 to 1708 in FIG. 18 are eco-guide menu having a tab form. In the initial state of the screen, the paper-saving key 1706 and single-sided document→double-sided copy setting 1711 are selected. These keys are indicated differently from other keys, e.g., different background colors, so as to be easily recognized as selected keys. This screen further includes a toner-saving key 1707 and energy-saving key 1708. A close key 1709 is provided for closing this screen and returning to the screen in FIG. 8. Displayed in the upper left corner of the screen is a message 1710 indicative of a paper reduction rate. Displayed in the upper right corner of the screen are a return key 1701 for returning to the previous screen, and a save-more key 1702 for further energy-saving/resource-saving setting (when this key is depressed in the state shown in FIG. 18, the 4-in-1 paper-saving setting screen appears).

Displayed in the center of the screen are paper-saving setting selection keys 1711, 1712, 1713 and 1714. Displayed in the lower right corner of the screen are a use-this-setting key 1703, a return key 1704 for returning to the previous screen, and an other-method key 1705 for displaying guidance to other methods.

The screen in FIG. 18 shows "Saving paper to ½" as the paper-reduction-rate message 1710, and displays options along with previews, which enable to reduce the amount of paper consumption to ½. Among the options 1711 to 1714, the currently selected setting is displayed differently from other options, e.g., different background color, so as to be easily recognized as a selected option. The options for paper saving displayed in this screen are combinations of the original document type and output type in FIG. 9, and contents thereof are the same as that in FIG. 9.

Figure 19:
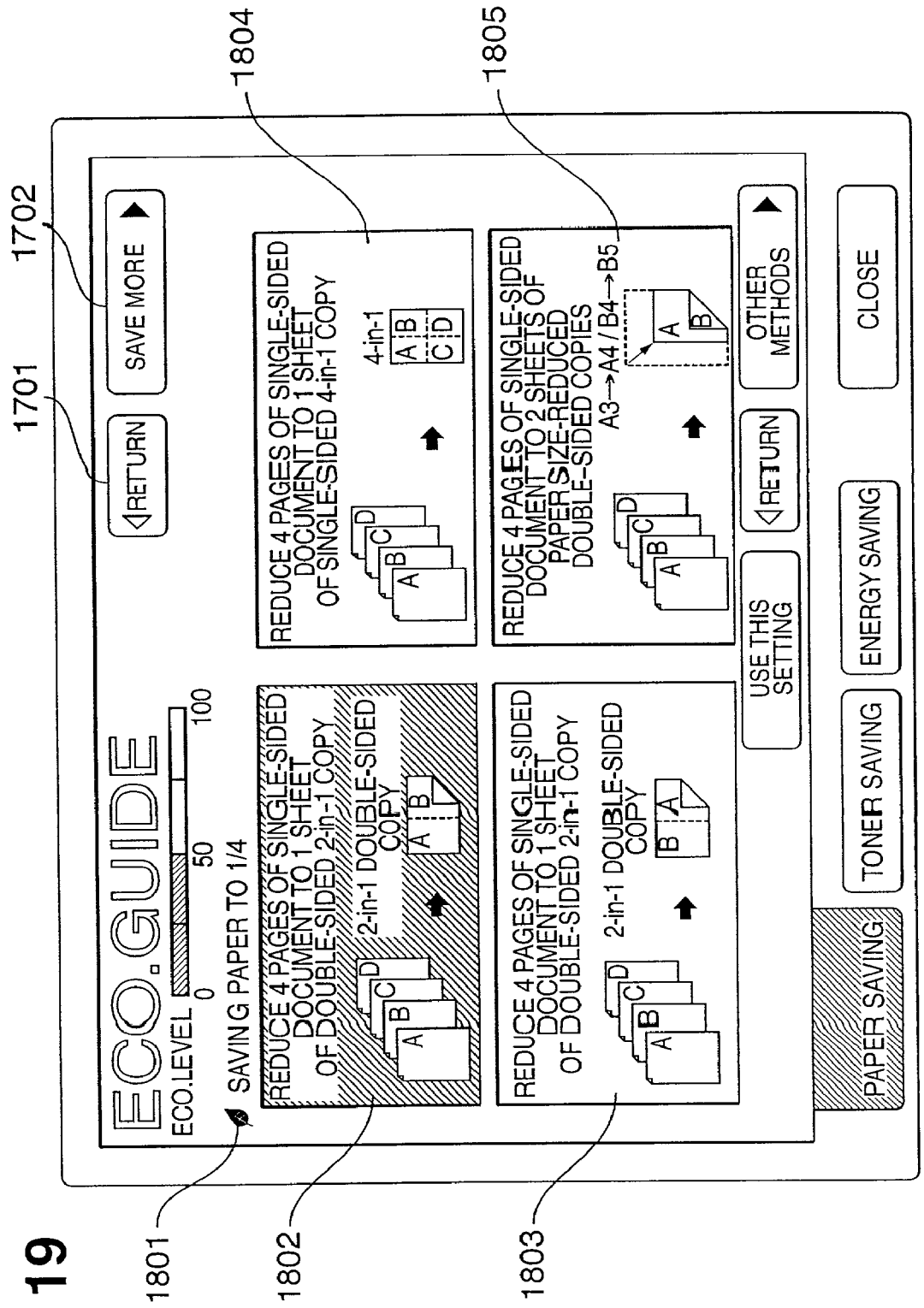
FIG. 19 is a view showing an eco-guide screen displayed in the display unit according to the embodiment of the present invention, wherein the ¼ paper-saving mode is selected and an original document is a single-sided portrait in the eco-guide screen.

The save-more key 1702 is provided for setting a mode to further reduce the output paper to ¼ or ⅛. When the save-more key 1702 is depressed, the screen in FIG. 19 is displayed. "Saving paper to ¼" is displayed as a paper-reduction-rate message 1801, and options 1802, 1803, 1804, and 1805 are displayed as ¼ paper reduction options. The options 1802 to 1805 are combinations of the original document type and output type in FIG. 13, and contents thereof are the same as that in FIG. 13. When the save-more key 1702 is depressed in FIG. 19, a guidance screen for ⅛ paper saving is displayed.

Figure 20:
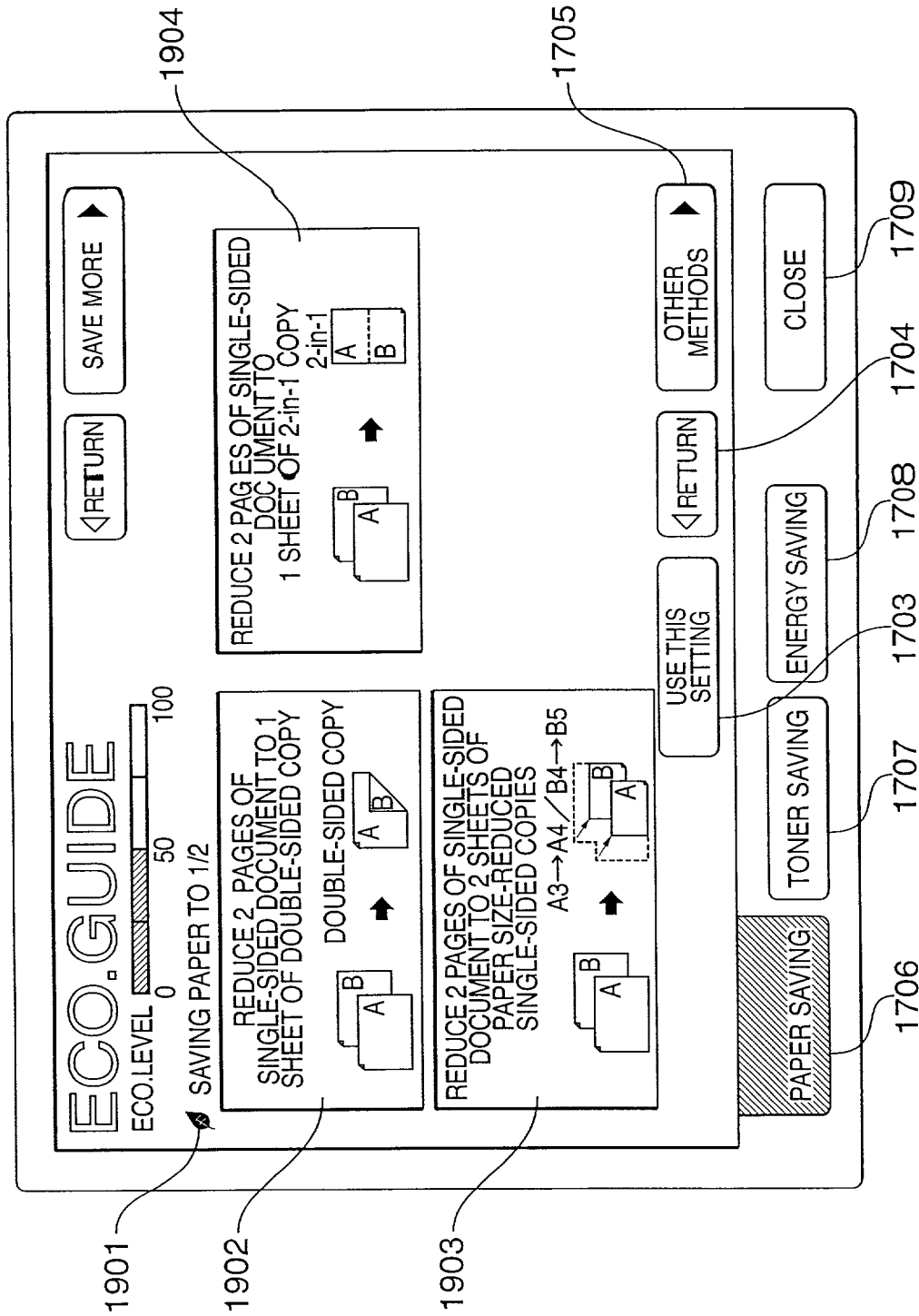
FIG. 20 is a view showing an eco-guide screen displayed in the display unit according to the embodiment of the present invention, wherein the ½ paper-saving mode is selected and an original document is a single-sided landscape in the eco-guide screen.

When the other-method key 1705 in FIG. 18 is depressed, the screen in FIG. 20 is displayed.

The screen in FIG. 20 shows "Saving paper to ½" as a paper-reduction-rate message 1901, and displays paper-saving options 1902, 1903, and 1904. The options are the same as the output type options displayed when the single-sided landscape key 803 in FIG. 10 is depressed, and contents thereof are the same.

Similarly, when the other-method key 1705 is depressed, options for different original document types, which have similar contents as that in the ½ paper-saving mode shown in FIGS. 11 and 12, are displayed. Similarly, when the other-method key is depressed on the ¼ paper-saving screen in FIG. 19 or a ⅛ paper-saving screen (not shown), options for different original document types are displayed.

As described above, when the paper-saving setting is performed on the eco-guide screen, further depressing the save-more key 1702 results in displaying the same setting items as that displayed at the time of selecting the ½ paper-saving key 701, ¼ paper-saving key 702, and ⅛ paper-saving key 703 in FIG. 8.

Furthermore, depressing the other-method key 1705 enables to display one screen at the time, the combinations of the original document types and output types described in FIGS. 9 to 12, and enables a user to perform setting.

Figure 21:
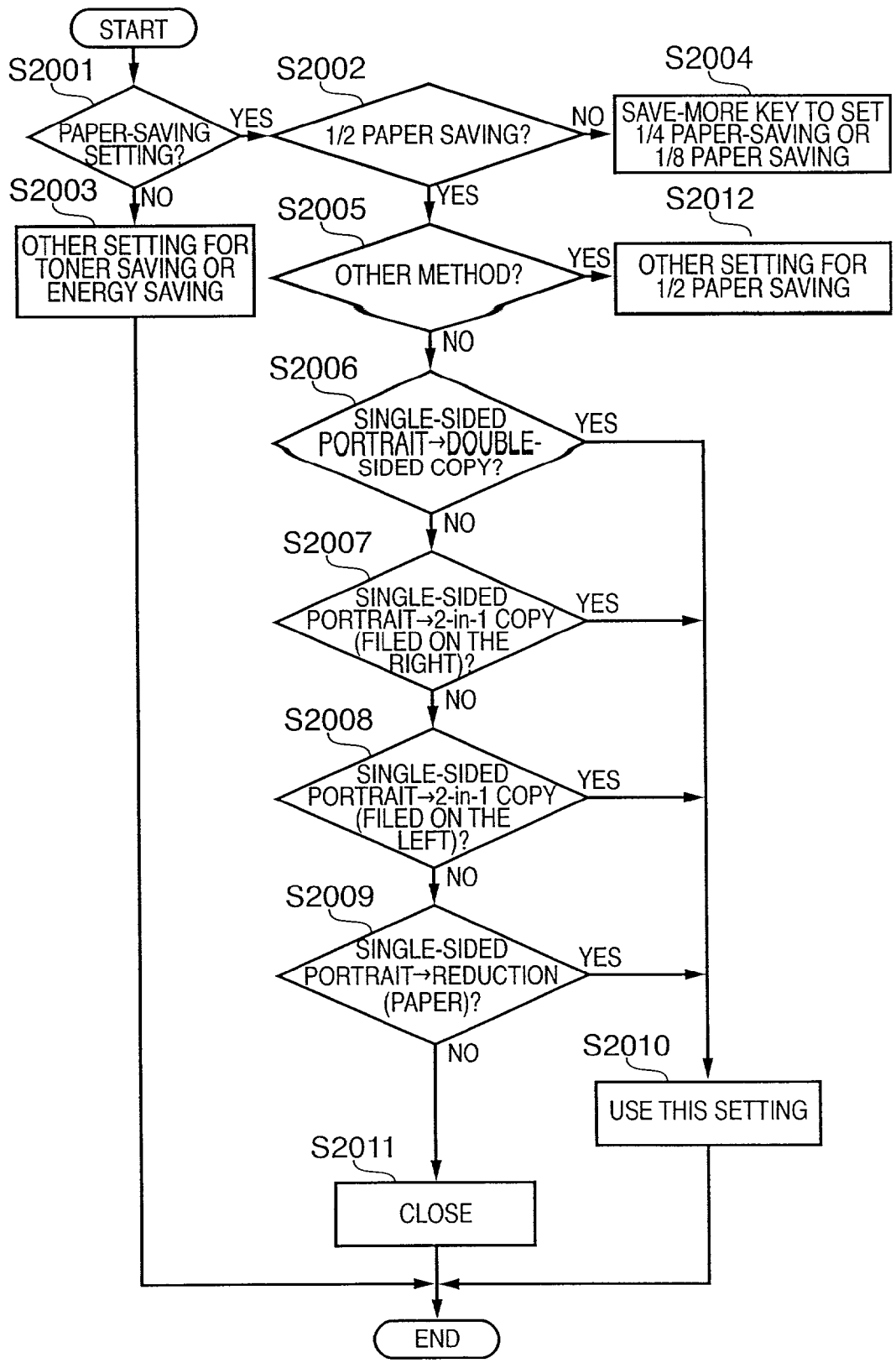
FIG. 21 is a flowchart describing selection operation in the eco-guide screen according to the embodiment of the present invention, wherein ½ paper-saving mode is selected and an original document is a single-sided portrait in the eco-guide screen.

FIG. 21 is a flowchart describing selection operation on the screen shown in FIG. 18 after the eco-guide key 706 is depressed on the eco-mode operation screen in FIG. 8.

First, it is determined whether or not paper-saving setting is to be performed (step S2001). If NO, the control proceeds to toner-saving setting or energy-saving setting (step S2003). Meanwhile, if YES at step S2001, whether or not ½ paper saving is to be performed is confirmed by the message 1710 (step S2002). If further paper saving is desired, the save-more key 1702 is depressed, and the control proceeds to ¼ paper-saving setting shown in FIG. 19 or ⅛ paper-saving setting (step S2004).

When the ½ paper saving is desired but the original document type is not found in the screen shown in FIG. 18, the other-method key 1705 is depressed (step S2005) to proceed to the setting for other original document types shown in FIG. 20 (step S2012). When selection is to be made from the options 1711 to 1714 in FIG. 18, one setting is selected from the four options (YES at one of the steps S2006, S2007, S2008 or S2009), and the use-this-setting key 1703 is depressed (step S2010) to end the setting operation. When the close key 1709 is depressed instead of the use-this-setting key 1703, the setting returns to the one before the eco-guide key 706 is depressed, and the screen in FIG. 8 is displayed.

Figure 22:
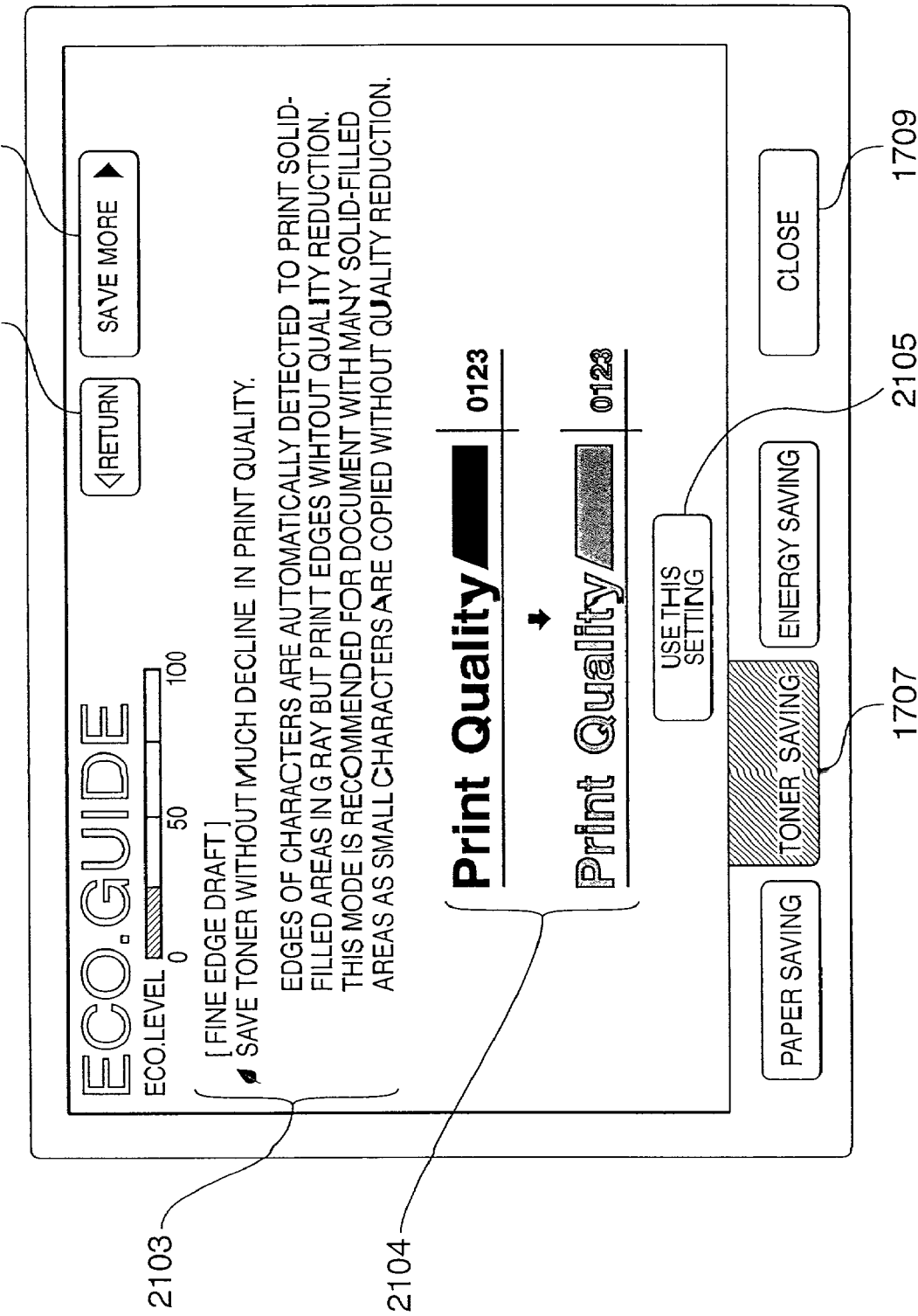
FIG. 22 is a view showing an eco-guide screen displayed in the display unit according to the embodiment of the present invention, wherein a toner-saving mode and a fine-edge-draft mode are selected in the eco-guide screen.

FIG. 22 shows a screen when the toner-saving key 1707 is depressed on the screen in FIG. 18.

A reduction message 2103 and preview 2104 in the toner-saving mode are displayed. Depression of a use-this-setting key 2105 effects the same setting as the case where the fine edge draft key 1402 and OK key 1407 are depressed on the screen in FIG. 15. If further saving is desired, a save-more key 2101 is depressed to proceed to the screen in FIG. 23.

Figure 23:
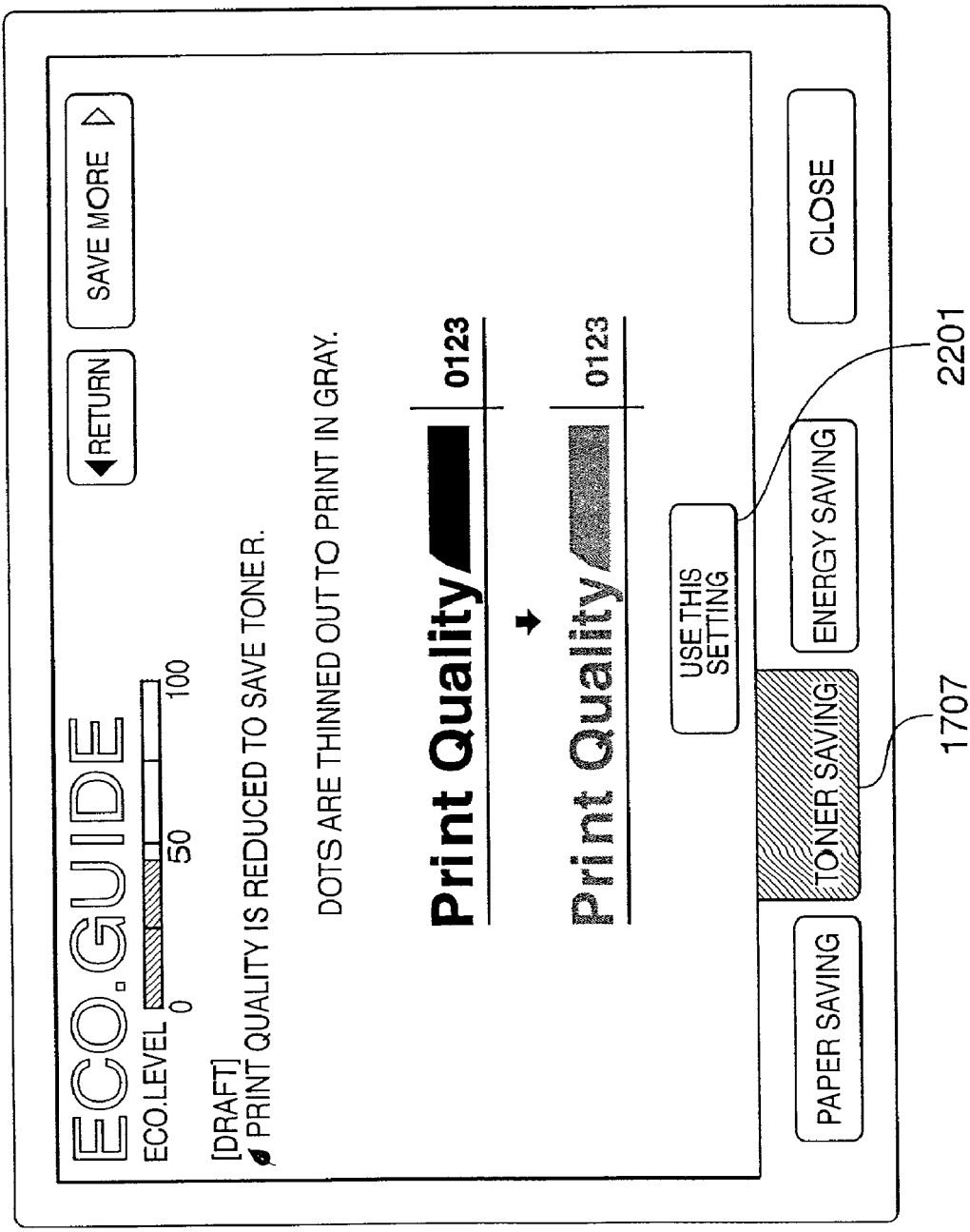
FIG. 23 is a view showing an eco-guide screen displayed in the display unit according to the embodiment of the present invention, wherein the toner-saving mode and a draft mode are selected in the eco-guide screen.

FIG. 23 shows a draft mode of the toner-saving mode. Depressing a use-this-setting key 2201 effects the same setting as the case where the draft key 1403 and OK key 1407 are depressed on the screen in FIG. 15.

Figure 24:
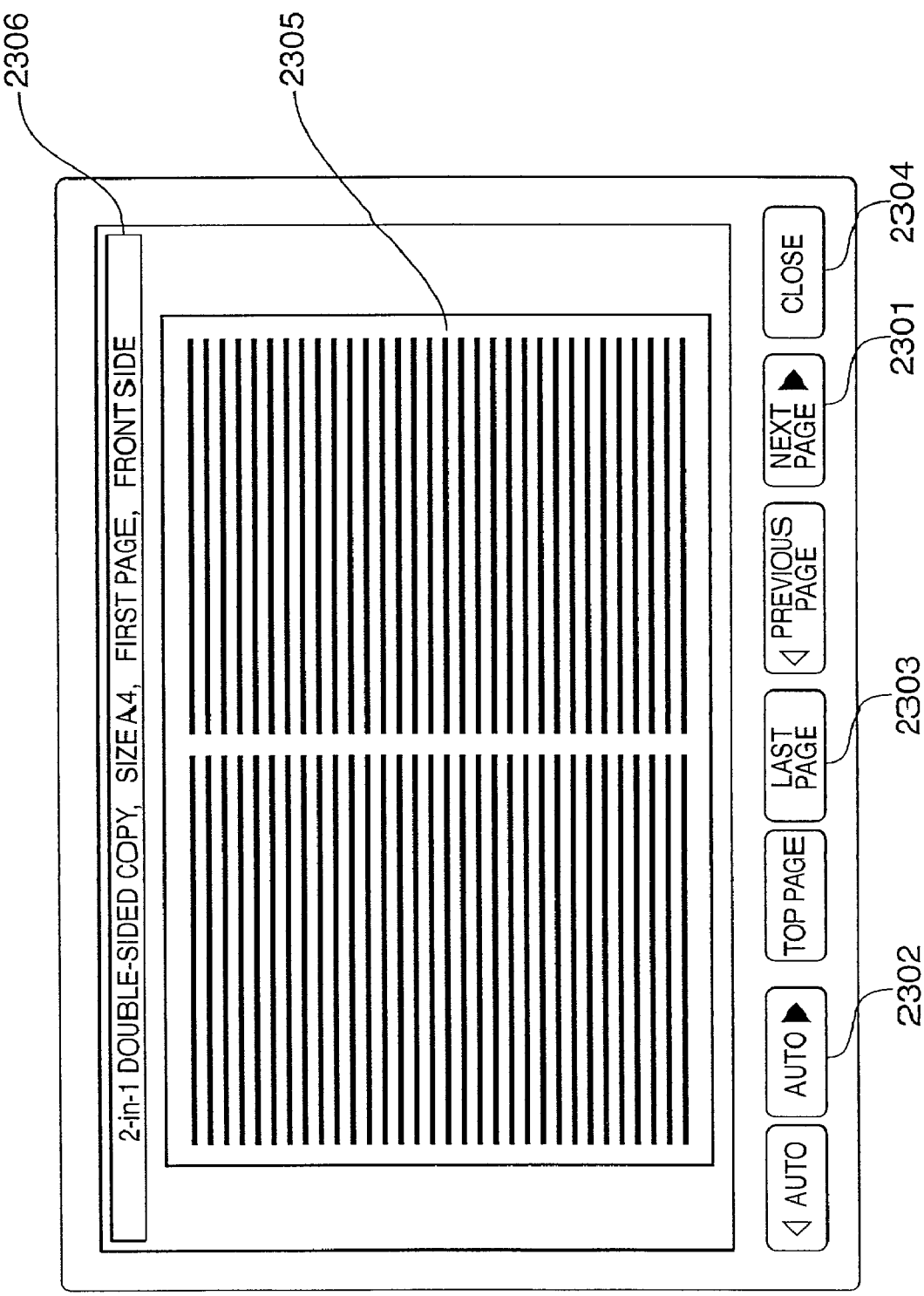
FIG. 24 is a view showing a preview screen displayed in the display unit according to the embodiment of the present invention.

FIG. 24 shows a screen displayed when the copy preview key 709 is depressed on the eco-mode operation screen in FIG. 8.

Upon depression of the copy preview key 709, the scanner 2070 reads an image of an original document and outputs a preview, reflecting various settings, for a user to confirm.

FIG. 24 shows the screen in the case where the 2-in-1 double-sided copy is set as the output type. Displayed in the center of the screen is a preview 2305 reflecting various settings, above the preview 2305 is a message area 2306 indicating the setting, and below the preview 2305 are control keys for turning pages.

Auto keys 2302 automatically turn pages for previewing plural pages of copies, enabling to display images of the output copies. Depressing a last-page key 2303 causes displaying of the last page of the copies. Depressing a next-page key 2301 causes displaying of the next page of the currently displayed page. When the second and following pages are displayed, an auto key for automatically turning to previous pages, a top-page key for turning to the first page, and a previous page key for turning to the previous page can be used to preview a desired page, although the foregoing keys are indicated as not selectable in FIG. 24 since the first page of the output copies is displayed in the preview.

Depressing the close key 2304 enables to return to the eco-mode operation screen in FIG. 8.

Although the foregoing embodiment has described a case in which the ½ paper-saving setting, ¼ paper-saving setting, ⅛ paper-saving setting, and toner-saving setting are available for resource-saving setting, the present invention is not limited to these settings. One or combinations with other resource-saving methods may be adopted.

Furthermore, although the above-described toner-saving setting has realized toner saving by two levels of different printing methods, one or combinations with other toner-saving methods are applicable.

Moreover, although the above-described embodiment comprises a hard key to realize eco-mode switch key, the present invention is not limited to this. In place of the eco-mode switch key 2019, a soft key may be provided on the standard-operation screen shown in FIG. 7 for switching to the eco-mode operation screen, and a soft key may be provided on the eco-mode operation screen shown in FIG. 8 for switching to the standard-operation screen.

As has been set forth above, according to the present embodiment, it is possible to display the energy-saving/resource-saving setting functions in an easy-to-understand manner, thereby enabling the energy-saving/resource-saving setting with simple operation.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiment.

Figure 5:
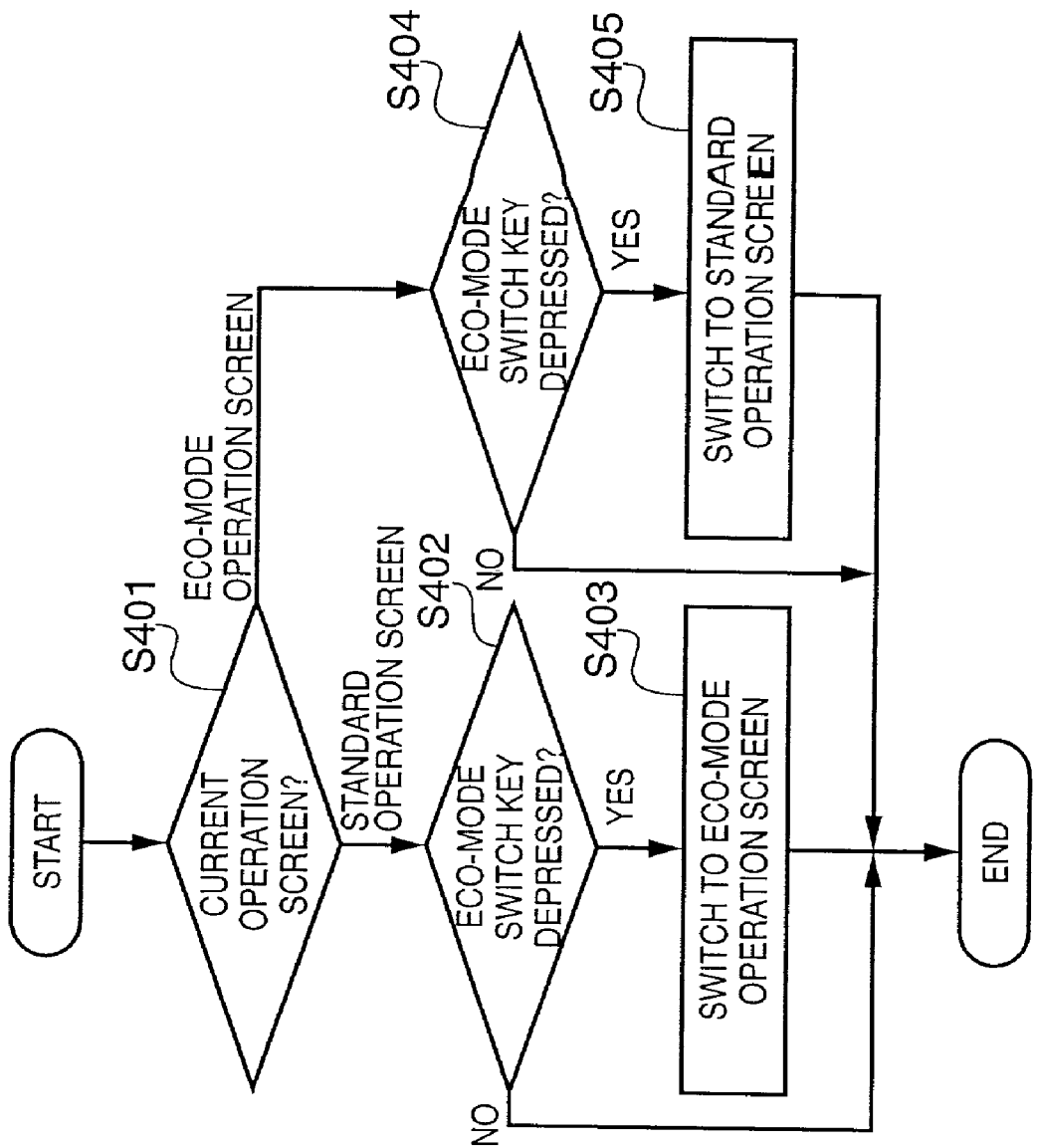
FIG. 5 is a flowchart describing switching operation of a control panel according to the embodiment of the present invention.

In a case where the present invention is applied to the aforesaid storage medium, the storage medium stores program codes corresponding to the flowcharts shown in FIGS. 5 and 6, 16 and/or 21 and program codes for causing the operation screens shown in FIGS. 7 to 15, 17 to 20, and/or 22 to 24 to be displayed on the LCD display unit 2013 of the control panel 2012 described in the embodiment.

The present invention is not limited to the above embodiments and various changes and modifications can be made within the spirit and scope of the present invention. Therefore, to apprise the public of the scope of the present invention, the following claims are made.

What is claimed is:

1. An apparatus comprising a user interface including:
paper consumption amount designation means for allowing a user to designate a rate of reducing a paper consumption amount;
display control means for controlling to display a plurality of setting options which enable the user to reduce paper consumption amount at the rate designated by said paper consumption amount designation means, the plurality of setting options including at least two options from among (1) a first option, which enables the user to output a double-sided copy of a single-sided original document, (2) a second option, which enables the user to output a paper size reduction copy of an original document, and (3) a third option, which enables the user to output an image size reduction copy of an original document;
selection means for allowing the user to select a desired setting option from the plurality of setting options displayed; and
setting means for performing setting for copying with the setting option selected by said selection means.

2. The apparatus according to claim 1, wherein said user interface is capable of being operated in a first mode or a second mode interchangeably, said first mode constituted by said paper consumption amount designation means, display control means, selection means, and setting means, and being provided for performing setting for copying based on the designated rate of reducing a paper consumption amount, while said second mode is provided for performing standard setting for copying.

3. The apparatus according to claim 2, further comprising switching means for switching between said first mode and second mode.

4. The apparatus according to claim 1, wherein the third option includes at least one of (a) a first paper-saving mode which reduces a quantity of output paper to ½ of a quantity of read original documents, (b) a second paper-saving mode which reduces a quantity of output paper to ¼ of a quantity of read original documents, and (c) a third paper-saving mode which reduces a quantity of output paper to ⅛ of a quantity of read original documents.

5. The apparatus according to claim 1, further comprising checking means for displaying a paper consumption amount saving level.

6. The apparatus according to claim 5, wherein said checking means obtains the paper consumption amount saving level based on a past image formation operation record, and displays the obtained level.

7. The apparatus according to claim 1, further comprising a guidance mode, constituted by said paper consumption amount designation means, display control means, selection means, and setting means, for performing setting for copying according to guidance based on paper consumption amount.

8. The apparatus according to claim 1, further comprising preview means for previewing an image to be obtained after image formation, prior to actual image formation.

9. The apparatus according to claim 1, further comprising a screen for displaying the setting for copying.

10. The apparatus according to claim 1, further comprising a scanner for reading an original document, wherein setting for copying is performed by using the read original document.

11. The apparatus according to claim 1, wherein the second option includes at least one of (a) an A3-to-A4 reduction copy and (b) a B4-to-B5 reduction copy, and the third option includes at least one of (c) a 2-in-1 copy and (d) a 4-in-1 copy.

12. A setting operation method comprising:
a paper consumption amount designation step of allowing a user to designate a rate or reducing a paper consumption amount;
a display control step of controlling to display a plurality of setting options which enable the user to reduce paper consumption amount at the rate designated in said paper consumption amount designation step, the plurality of setting options including at least two options from among (1) a first option, which enables the user to output a double-sided copy of a single-sided original document, (2) a second option, which enables the user to output a paper size reduction copy of an original document, and (3) a third option, which enables the user to output an image size reduction copy of an original document;
a selection step of allowing the user to select a desired setting option from the plurality of setting options displayed; and
a setting step of performing setting for copying with the setting option selected in said selection step.

13. The method according to claim 12, wherein said setting operation method is capable of being operated in a first mode or a second mode interchangeably, the first mode including said paper consumption amount designation step, display control step, selection step, and setting step, and being provided for performing setting for copying based on the designated rate of reducing a paper consumption amount, while the second mode is provided for performing standard setting for copying.

14. The method according to claim 13, further comprising a switching step of switching between the first mode and second mode.

15. The method according to claim 12, wherein the third option includes at least one of (a) a first paper-saving mode which reduces a quantity of output paper to ½ of a quantity of read original documents, (b) a second paper-saving mode which reduces a quantity of output paper to ¼ of a quantity of read original documents, and (c) a third paper-saving mode which reduces a quantity of output paper to ⅛ of a quantity of read original documents.

16. The method according to claim 12, further comprising a checking step of displaying a paper consumption amount saving level.

17. The method according to claim 16, wherein, in said checking step, the paper consumption amount saving level is obtained based on a past image formation operation record, and the obtained level is displayed.

18. The method according to claim 12, further comprising a guidance mode for performing setting for copying according to guidance.

19. The method according to claim 12, further comprising a preview step of previewing an image to be obtained after image formation, prior to actual image formation.

20. The method according to claim 12, further comprising a step of displaying a screen for displaying the setting for copying.

21. The method according to claim 12, wherein the second option includes at least one of (a) an A3-to-A-4 reduction copy and (b) a B4-to-B5 reduction copy, and the third option includes at least one of (c) a 2-in-1 copy, and (d) a 4-in-1 copy.

22. A computer program product comprising a computer readable medium having computer readable program code means embodied in said medium for a setting operation, said product including:
first computer readable program code means for allowing a user to designate a rate of reducing a paper consumption amount;
second computer readable program code means for controlling to display a plurality of setting options which enable the user to reduce paper consumption amount at the rate designated upon execution of said first computer readable program means, the plurality of setting options including at least two options from among (1) a first option, which enables the user to output a double-sided copy of a single-sided original document, (2) a second option, which enables the user to output a paper size reduction copy of an original document, and a third option, which enables the use to output an image size reduction copy of an original document;
third computer readable program code means for allowing the user to select a desired setting option from the plurality of setting options displayed; and
fourth computer readable program code means for performing setting for copying with the selected setting option.

* * * * *

UNITED STATES PATENT AND TRADEMARK OFFICE
CERTIFICATE OF CORRECTION

| | | |
|---|---|---|
| PATENT NO. | : 7,062,190 B2 | |
| APPLICATION NO. | : 10/012408 | |
| DATED | : June 13, 2006 | |
| INVENTOR(S) | : Noriaki Miyamoto | |

It is certified that error appears in the above-identified patent and that said Letters Patent is hereby corrected as shown below:

ON THE TITLE PAGE [56]:

Foreign Patent Documents,
        "JP 09206718  7/1997  should read --JP 9-206718  7/1997
        JP  10073970  3/1998"        JP 10-73970  3/1998--.

SHEET 22:

Figure 22, "G RAY" should read --GRAY--.

COLUMN 1:

Line 53, "operation" should read --an operation--; and
    Line 58, "a case" should read --a case where--.

COLUMN 2:

Line 49, "copying" should read --a copying-- and "enabling" should read
        --enabling the user--.

COLUMN 5:

Line 23, "1001 is" should read --1001 and is--.

COLUMN 6:

Line 5, "of expandability" should read --the expandability--; and
    Line 51, "other" should read --another--.

COLUMN 8:

Line 60, "enable" should read --enable the user--; and
    Line 66, "enable" should read --enable the user--.

UNITED STATES PATENT AND TRADEMARK OFFICE
CERTIFICATE OF CORRECTION

PATENT NO. : 7,062,190 B2
APPLICATION NO. : 10/012408
DATED : June 13, 2006
INVENTOR(S) : Noriaki Miyamoto It is certified that error appears in the above-identified patent and that said Letters Patent is hereby corrected as shown below:

<u>COLUMN 9</u>:

Line 9, "enable" should read --enable the user--; and
    Line 15, "enable" should read --enable the user--.

<u>COLUMN 10</u>:

Line 33, "enabling" should read --enabling the user--; and
    Line 35, "eco level" should read --eco-level--.

<u>COLUMN 11</u>:

Line 60, "enable" should read --enable the user--.

<u>COLUMN 12</u>:

Line 34, "enables" should read --enables the user--.

<u>COLUMN 13</u>:

Line 21, "enabling" should read --enabling the user--;
    Line 32, "enables" should read --enables the user--; and
    Line 46, "realize" should read --realize the--.

<u>COLUMN 14</u>:

Line 16, "a part" should read --a part of--;
    Line 17, "processes" should read --processing--; and
    Line 26, "a part" should read --a part of--.

UNITED STATES PATENT AND TRADEMARK OFFICE
CERTIFICATE OF CORRECTION

PATENT NO. : 7,062,190 B2
APPLICATION NO. : 10/012408
DATED : June 13, 2006
INVENTOR(S) : Noriaki Miyamoto It is certified that error appears in the above-identified patent and that said Letters Patent is hereby corrected as shown below:

COLUMN 16:

Line 56, "the use" should read --the user--; and
Line 36, "A3-to-A-4" should read --A3-to-A4--.

Signed and Sealed this

Ninth Day of January, 2007

JON W. DUDAS
*Director of the United States Patent and Trademark Office*